United States Patent
Song et al.

(10) Patent No.: US 10,412,265 B2
(45) Date of Patent: Sep. 10, 2019

(54) INFORMATION PROCESSING APPARATUS THAT DISPLAYS A PROMPT TO MOVE THE APPARATUS AND INFORMATION PROCESSING METHOD

(71) Applicant: CANON KABUSHIKI KAISHA, Tokyo (JP)

(72) Inventors: Wei Song, Kawasaki (JP); Nobutaka Miyake, Yokohama (JP); Yuki Ishida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 15/278,741

(22) Filed: Sep. 28, 2016

(65) Prior Publication Data

US 2017/0099411 A1    Apr. 6, 2017

(30) Foreign Application Priority Data

Oct. 6, 2015   (JP) .................................. 2015-198930
Oct. 6, 2015   (JP) .................................. 2015-198931

(51) Int. Cl.
*H04N 1/409*   (2006.01)
*H04N 1/00*    (2006.01)
(Continued)

(52) U.S. Cl.
CPC ............. *H04N 1/409* (2013.01); *G06T 1/005* (2013.01); *G06T 5/002* (2013.01); *G06T 5/50* (2013.01);
(Continued)

(58) Field of Classification Search
CPC ............... H04N 1/409; H04N 1/00251; H04N 1/00408; G06T 5/50; G06T 5/002;
(Continued)

(56) References Cited

U.S. PATENT DOCUMENTS 9,237,465 B1 *   1/2016   Tanner ................. H04B 5/0031
9,589,202 B1 *   3/2017   Wilbert ................. G06K 9/325
(Continued)

FOREIGN PATENT DOCUMENTS

JP    2003101761 A    4/2003
JP    2004282708 A    10/2004
(Continued)

OTHER PUBLICATIONS

Japanese Office Action issued in corresponding Japanese Parent Application No. 2015198930 dated Aug. 2, 2019.
(Continued)

*Primary Examiner* — Ming Y Hon
(74) *Attorney, Agent, or Firm* — Venable LLP

(57) ABSTRACT

An image in which additional information is embedded is shot by an imaging unit. The additional information embedded in the image is acquired from the shot image. When the additional information cannot be acquired, a display unit is caused to display information that prompts a user to move the information processing apparatus. The additional information embedded in the image is acquired from an image shot after the information that prompts the user to move the information processing apparatus is displayed.

24 Claims, 25 Drawing Sheets

(51) Int. Cl.
*G06T 5/00* (2006.01)
*G06T 5/50* (2006.01)
*G06T 1/00* (2006.01)

(52) U.S. Cl.
CPC ..... *H04N 1/00251* (2013.01); *H04N 1/00408* (2013.01); *G06T 2201/0061* (2013.01); *G06T 2201/0065* (2013.01); *G06T 2201/0601* (2013.01); *G06T 2207/20092* (2013.01)

(58) Field of Classification Search
CPC ........... G06T 1/005; G06T 2207/20092; G06T 2201/0061; G06T 2201/0065; G06T 2201/0601
See application file for complete search history.

(56) References Cited

U.S. PATENT DOCUMENTS

| | | | | |
|---|---|---|---|---|
| 9,734,372 | B2* | 8/2017 | Lindbo | G06K 7/1413 |
| 10,122,802 | B2* | 11/2018 | Makino | H04L 67/18 |
| 2005/0269411 | A1* | 12/2005 | Vesikivi | G06K 7/10851 |
| | | | | 235/462.01 |
| 2006/0192762 | A1* | 8/2006 | Corrion | G06F 3/0317 |
| | | | | 345/166 |
| 2007/0008171 | A1* | 1/2007 | Bowman | G01D 4/004 |
| | | | | 340/870.02 |
| 2013/0155474 | A1* | 6/2013 | Roach | G06Q 20/322 |
| | | | | 358/505 |
| 2013/0249736 | A1* | 9/2013 | Nikitin | G01S 5/02 |
| | | | | 342/450 |
| 2014/0362248 | A1* | 12/2014 | Ishida | H04N 5/23293 |
| | | | | 348/222.1 |

FOREIGN PATENT DOCUMENTS

| | | |
|---|---|---|
| JP | 2004350041 A | 12/2004 |
| JP | 2005094107 A | 4/2005 |
| JP | 2005122609 A | 5/2005 |
| JP | 2005-295458 A | 10/2005 |
| JP | 2006-50043 A | 2/2006 |
| JP | 200605001 A | 2/2006 |

OTHER PUBLICATIONS

Japanese Office Action issued in corresponding Japanese Parent Application No. 2015198931 dated Aug. 2, 2019.

* cited by examiner

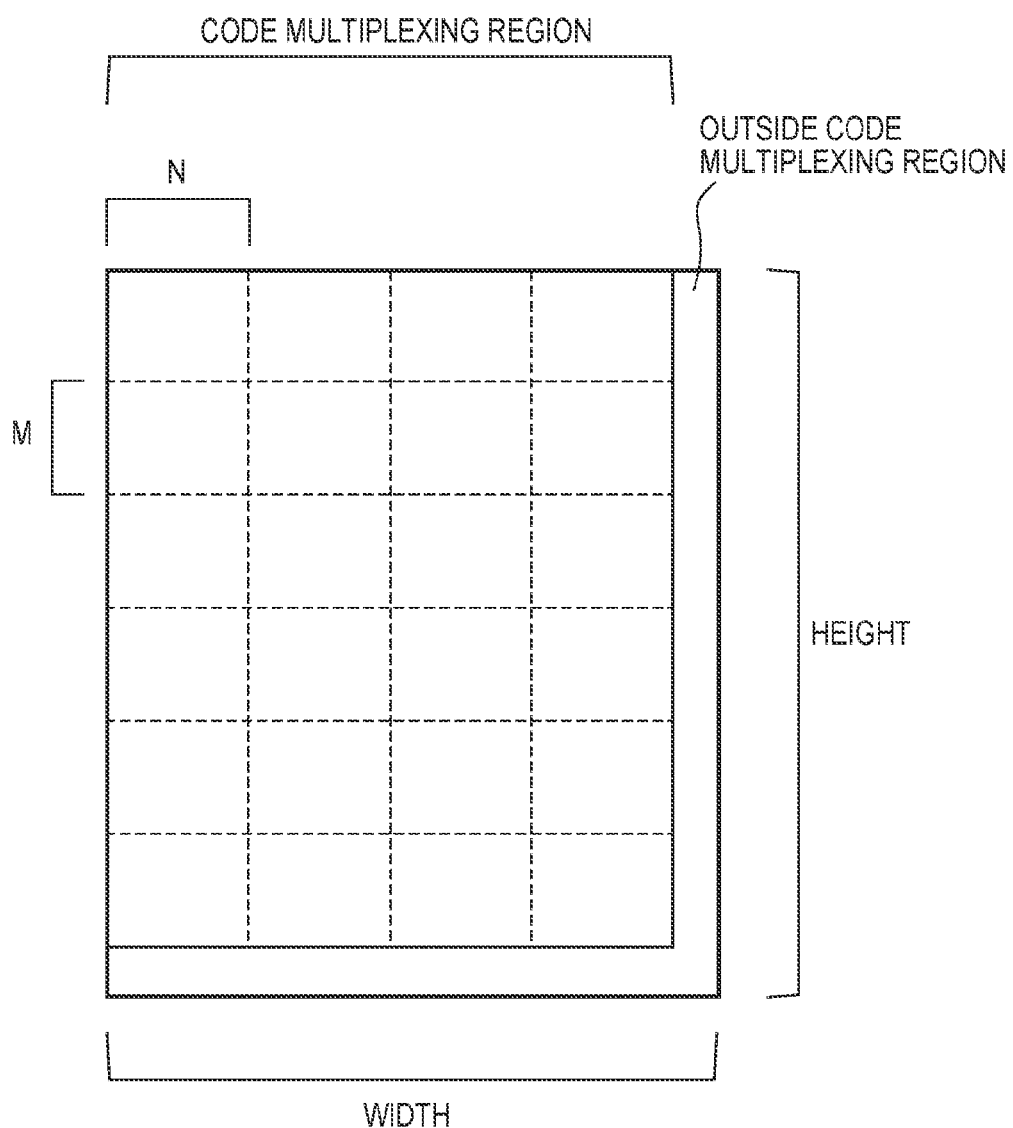

FIG. 6A
FIG. 6B
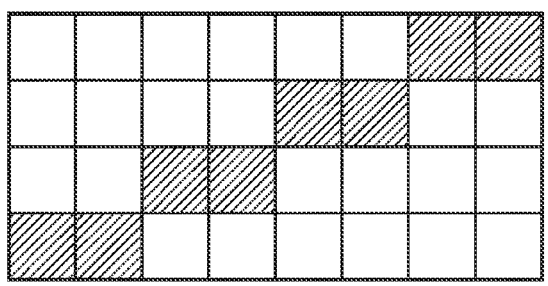
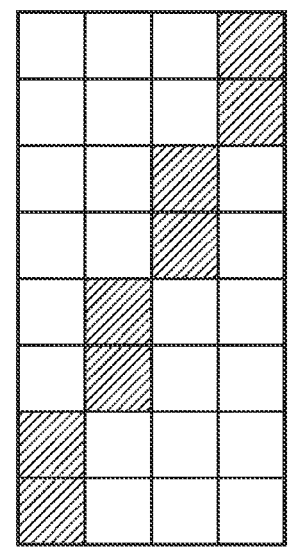

FIG. 9A

|   |   |   | -1 | -1 |
|---|---|---|----|----|
|   | -1 | -1 | 2 | 2 |
| -1 | 2 | 2 | -1 | -1 |
| 2 | -1 | -1 |   |   |
| -1 |   |   |   |   |

FIG. 9B

|   |   | -1 | 2 | -1 |
|---|---|----|---|----|
|   |   | -1 | 2 | -1 |
|   | -1 | 2 | -1 |   |
|   | -1 | 2 | -1 |   |
| -1 | 2 | -1 |   |   |

FIG. 12

| 3 | 3 | 2 | 2 | 1 | 1 | 0 | 0 | 3 | 3 | 2 | 2 | 1 | 1 | 0 | 0 |
|---|---|---|---|---|---|---|---|---|---|---|---|---|---|---|---|
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |

FIG. 13

| 3 | 2 | 1 | 0 | 3 | 2 | 1 | 0 | 3 | 2 | 1 | 0 | 3 | 2 | 1 | 0 |
|---|---|---|---|---|---|---|---|---|---|---|---|---|---|---|---|
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |

● : REFLECTION IMAGE OF LIGHT OF CAMERA

◯ : BLUR PORTION OF SHOT IMAGE
☆ : SHOOTING FOCUS POSITION

◯ : BLUR PORTION OF SHOT IMAGE
☆ : SHOOTING FOCUS POSITION

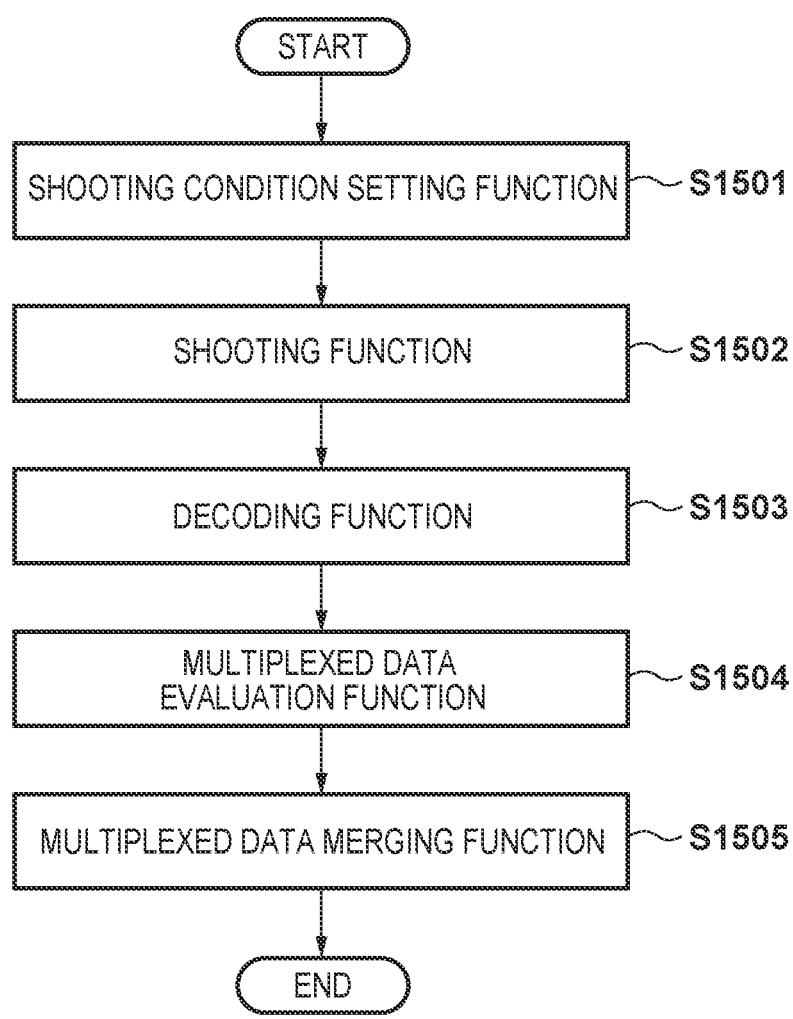

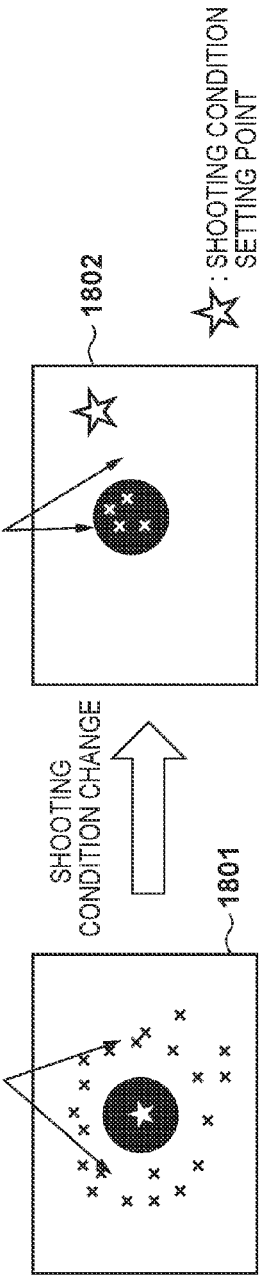
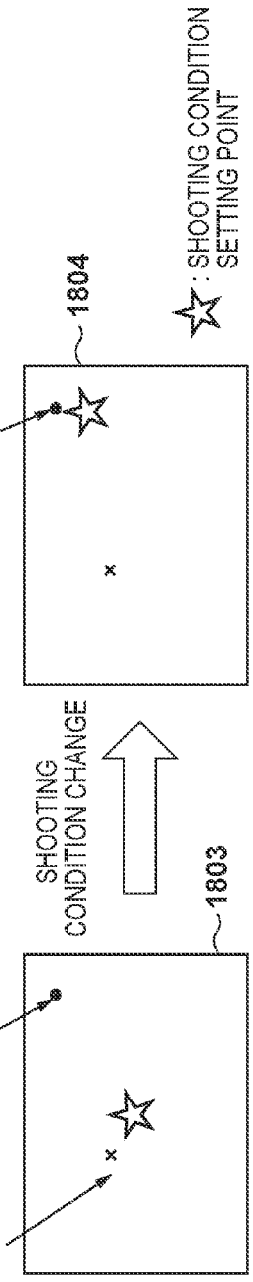

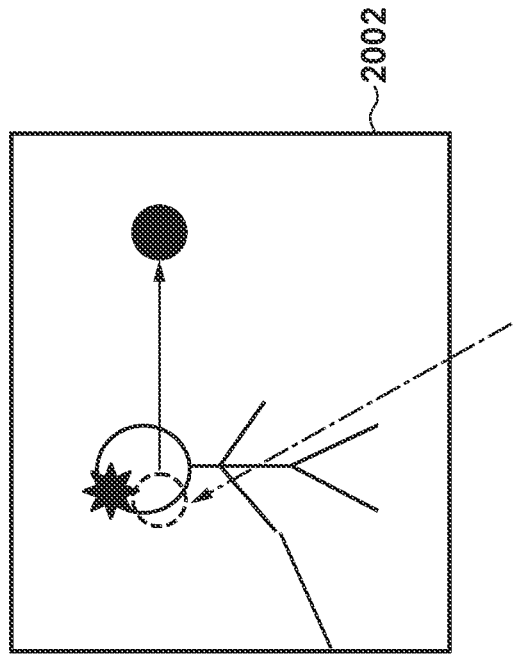
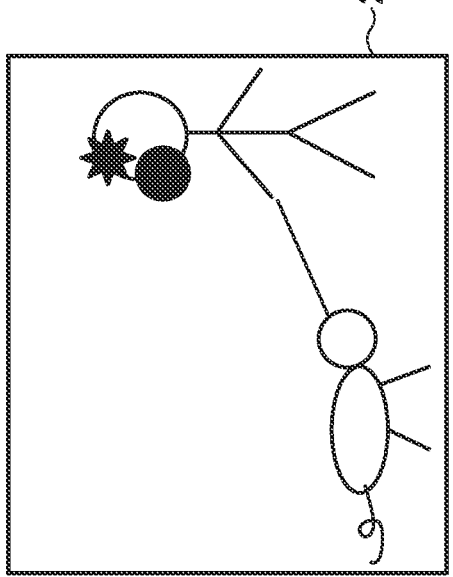

INFORMATION PROCESSING APPARATUS THAT DISPLAYS A PROMPT TO MOVE THE APPARATUS AND INFORMATION PROCESSING METHOD

BACKGROUND OF THE INVENTION

Field of the Invention

The present invention relates to an information processing apparatus and an information processing method and, more particularly, to image processing of reading out, by an imaging medium, additional information from a printed product in which information other than image information, for example, voice information, text information, and completely different image information such as pieces of information about an image are visually unnoticeably embedded as additional information in the image information.

Description of the Related Art

Recently, it is becoming possible to shoot a printed product with multiplexed additional information a plurality of times by a portable terminal and merge the analysis results of the plurality of shot images, thereby suppressing the influence of random noise such as a camera shake in the portable terminal and finally correctly acquiring the additional information of the printed product (for example, Japanese Patent Laid-Open No. 2006-50043).

In the conventional method, since random noise such as a camera shake exists in a difference place at random for each shot image, the influence of the random noise can be suppressed by merging the analysis results of the plurality of shot images. For example, if part of multiplexed additional information is acquired from at least one of the plurality of shot images, the whole additional information can be obtained by merging pieces of additional information demultiplexed from the plurality of images. However, stationary noise caused by the reflection image of the light of the portable terminal, lens aberrations, and the like continuously exists without changing its location for each shot image. For this reason, if the plurality of shot images are only merged by the conventional method, noise occurs at same position even in an image after merging, and additional information unintended by the user may be acquired.

SUMMARY OF THE INVENTION

The present invention provides an information processing apparatus considering stationary noise, an information processing method, and a program.

According to an aspect of the present invention, there is provided an information processing apparatus comprising: an image capturing unit configured to capture an image in which additional information is embedded; an acquisition unit configured to acquire the additional information embedded in the image from the captured image; and a display control unit configured to, when the acquisition unit cannot acquire the additional information, causes a display unit to display information that prompts a user to move the information processing apparatus, wherein the acquisition unit acquires the additional information embedded in the image from an image captured after the information that prompts the user to move the information processing apparatus is displayed.

According to the present invention, it is possible to provide a technique of enabling to acquire correct additional information by merging the analysis results of a plurality of images.

Further features of the present invention will become apparent from the following description of exemplary embodiments with reference to the attached drawings.

BRIEF DESCRIPTION OF THE DRAWINGS

FIG. 5 is a view showing a digital watermark superimposition region on a paper sheet;

FIGS. 6A and 6B are views for explaining the period of a change in a quantization threshold;

FIGS. 9A and 9B are views showing examples of spatial filters;

FIG. 12 is a view showing an example of a pixel specifying method;

FIG. 13 is a view showing an example of a pixel specifying method;

FIG. 15 is a flowchart showing suppressing stationary noise;

FIGS. 18A and 18B are views showing a detailed example of suppressing stationary noise;

FIGS. 20A and 20B are views showing a detailed example of suppressing stationary noise;

DESCRIPTION OF THE EMBODIMENTS

Preferred embodiments of the present invention will now be described in detail with reference to the accompanying drawings. Note that an image processing system according to an embodiment includes an additional information multiplexing unit 102 that embeds additional information in a printed material, a printer 103, and a camera-equipped portable terminal 104 including an additional information demultiplexing unit that reads the additional information from the printed material. Note that in this embodiment, such an imaging device will be referred to as a camera-equipped portable terminal. Note that terms "printing" and "printed material" used in the embodiments and the like include printing an object such as a character, a photograph, or a line drawing and a material obtained by printing the object. "Printing" and "printed material" can be replaced with "output" and "output material".

(First Embodiment)

Figure 1A:
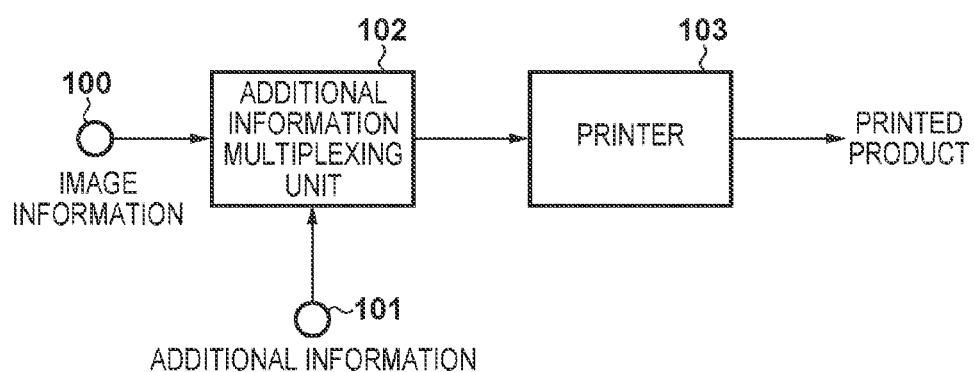
FIGS. 1A and 1B are block diagrams showing the arrangements of an additional information multiplexing unit and an additional information demultiplexing unit according to an embodiment.
Figure 1B:
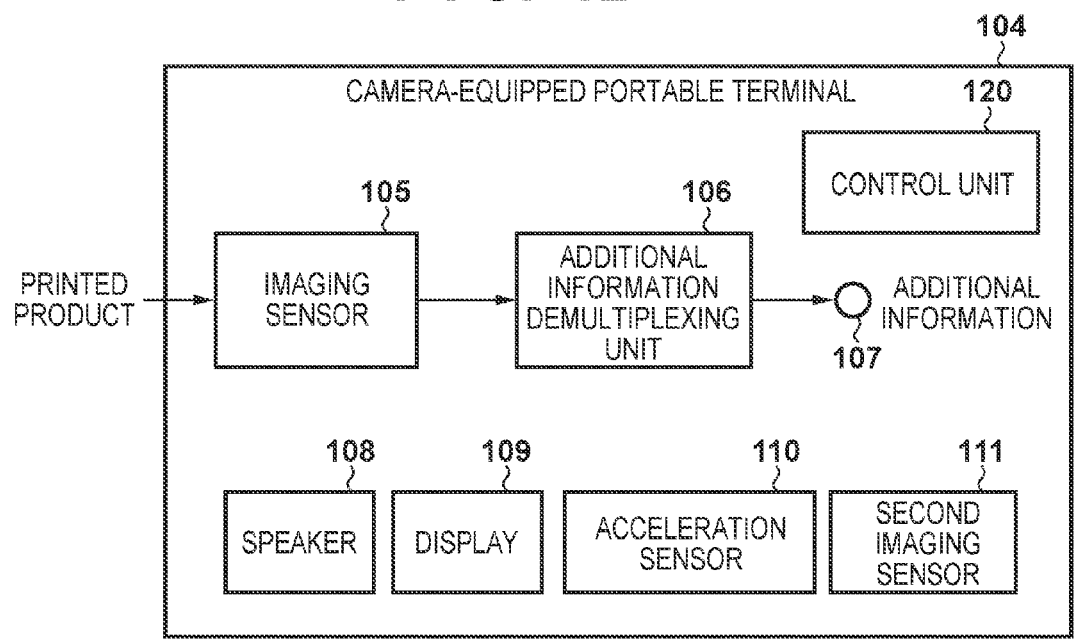

FIGS. 1A and 1B are block diagram showing the arrangement of an image processing system according to the first embodiment. Multi-tone image information is input from an input terminal 100, and additional information to be embedded in the image information is input from an input terminal 101. The additional information is information different from the image information, and examples are voice information, moving image information, and text information. The additional information multiplexing unit 102 embeds the additional information in the image information such that the additional information is difficult to visually discriminate. The additional information multiplexing unit 102 also executes quantization of the input multi-tone image information as well as multiplexing of the additional information. Note that the additional information multiplexing unit 102 may be installed in a computer as printer driver software or application software in the computer that generates a print image (image information) to be output to a printer engine mounted in a printer, a multi function peripheral, or the like. The additional information multiplexing unit may be incorporated as hardware and/or software in a copying machine, a facsimile apparatus, a printer body, or the like.

The printer 103 causes a printer engine to visualize, on a medium, information created by the additional information multiplexing unit 102, and outputs it as a printed material. The printer 103 is assumed to be a printer that implements a halftoning expression using pseudo-halftoning, for example, an inkjet printer or a laser printer.

An imaging sensor 105 of the camera-equipped portable terminal 104 reads the image on the output printed material. An additional information demultiplexing unit 106 demultiplexes the additional information (multiplexed data) embedded in the image printed on the printed material and outputs it to an output terminal 107. The output terminal 107 is an interface that outputs the acquired additional information. For example, voice information is output to a speaker 108, and image information is output to a display 109. The output terminal 107 may be an interface that outputs data to an external device. If the camera-equipped portable terminal 104 includes a plurality of imaging sensors, the printed product may be shot by a second imaging sensor 111. The camera-equipped portable terminal 104 includes a control unit 120. The control unit 120 adjusts, for example, the focus position of the optical system of the camera, a light for shooting, and the like in accordance with a user operation or a setting given in advance.

<Arrangement of Additional Information Multiplexing Unit 102>

Figure 2:
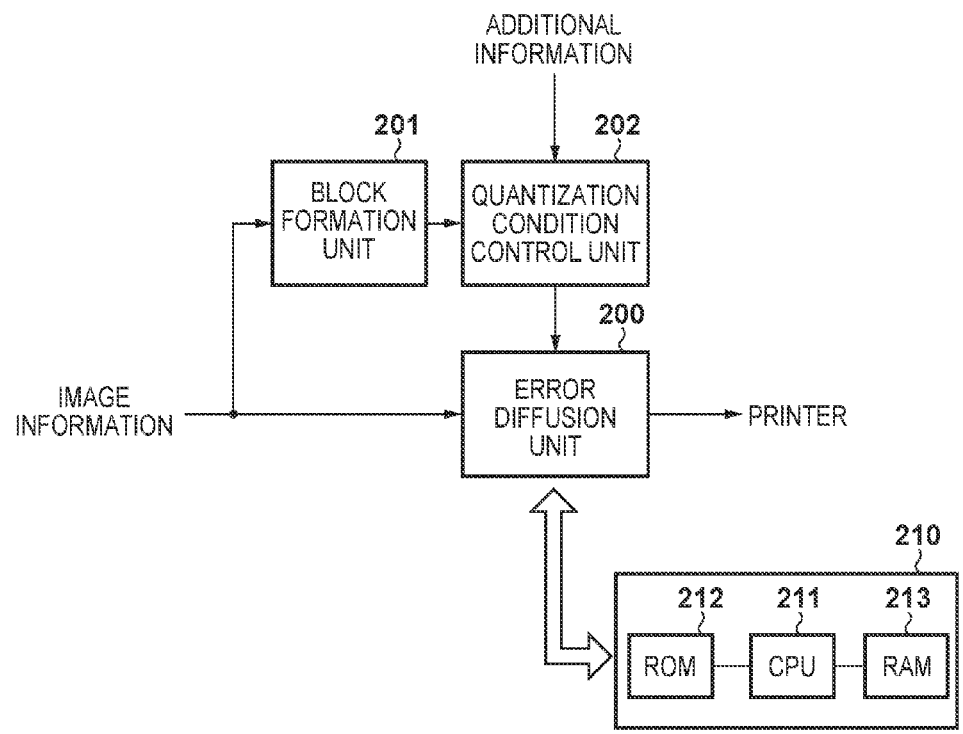
FIG. 2 is a block diagram showing the main part of the additional information multiplexing unit shown in FIG. 1A.

FIG. 2 is a block diagram showing the arrangement of the additional information multiplexing unit 102 shown in FIG. 1A. An error diffusion unit 200 performs pseudo-halftoning using an error diffusion method, thereby converting image information input from the input terminal 100 into a quantization level lower than the number of input tones, thereby areally expressing the tonality based on the quantized values of a plurality of pixels. The error diffusion unit 200 outputs a print image that has undergone the pseudo-halftoning to the printer 103. Details of error diffusion processing will be described later.

A block formation unit 201 segments input image information into predetermined regions (blocks). Note that a divided region may have a rectangular shape or any other shape. For example, image information may be divided into regions of the same attributes (for example, regions of objects). A quantization condition control unit 202 changes and controls a quantization condition for each block region formed by the block formation unit 201. The quantization condition control unit 202 controls the quantization condition for each block based on additional information input from the input terminal 101. The quantization condition controlled by the quantization condition control unit 202 and output includes, for example, a quantization threshold. In binarization, one quantization threshold is used. In multi-valuing, thresholds in a number according to the number of tones after quantization are output. The number of tones may be included in the quantization condition.

A control unit 210 includes a CPU 211, a ROM 212, a RAM 213, and the like. The CPU 211 executes a control program held in the ROM 212 and controls the operations and processing of the above-described components, for example, the error diffusion unit 200 and the quantization condition control unit 202. The RAM 213 is used as the work area of the CPU 211. The above-described blocks may be hardware controlled by the control unit 210 or logical functional blocks implemented by program execution by the control unit 210. The RAM 213 has a work area used by the CPU 211 to execute various kinds of processing.

<Arrangement of Error Diffusion Unit 200>

Figure 3:
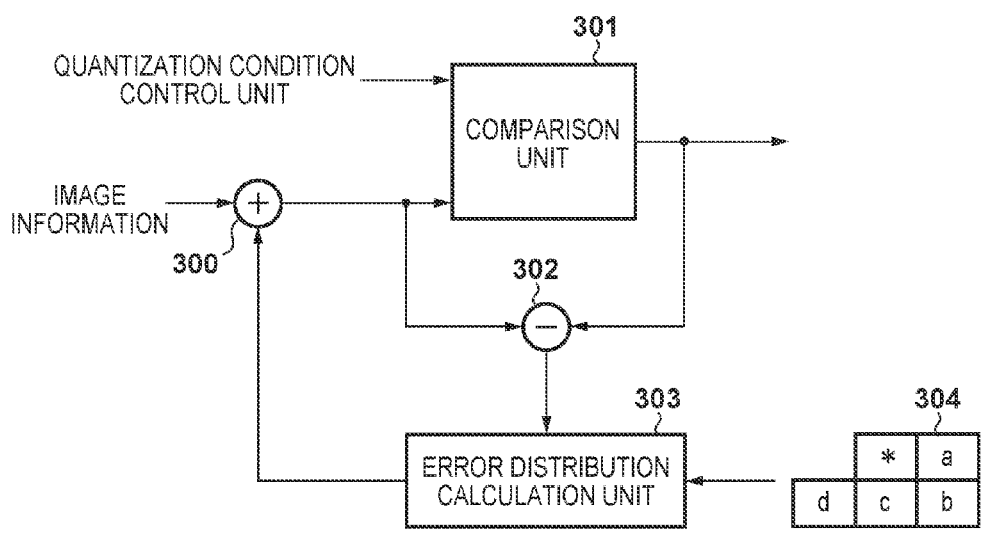
FIG. 3 is a block diagram showing details of a quantization unit.

FIG. 3 is a block diagram showing details of the error diffusion unit 200. In this embodiment, error diffusion processing in which the quantized value is binary will be exemplified.

An adder 300 adds the value of a pixel of interest of input image information and the distributed quantization error of an already binarized peripheral pixel. A comparison unit 301 compares a quantization threshold from the quantization condition control unit 202 and the pixel value with the error added by the adder 300. If the pixel value is larger than the quantization threshold (pixel value>threshold), the comparison unit 301 outputs "1". Otherwise (pixel value threshold), "0" is output. For example, when expressing pixel tonality at 8-bit accuracy, it is generally expressed by a maximum value "255" and a minimum value "0".

Assume that a dot (for example, ink or toner) is printed on paper when the quantized value is "1" (that is, 255). A subtracter 302 calculates an error, that is, a quantization error between the quantization result and the above-described addition result of the value of the pixel of interest and the distributed error. Based on a distribution ratio obtained by an error distribution calculation unit 303, the error is distributed to the peripheral pixels that undergo subsequent quantization processing. As for the error distribution ratio, a distribution table 304 of errors experimentally set based on the relative distances between a pixel of interest and peripheral pixels is held in advance. The error distribution calculation unit 303 distributes the quantization error obtained by the subtracter 302 based on the distribution ratio described in the distribution table 304. The distribution table 304 shown in FIG. 3 is a distribution table for four unquantized pixels out of the eight pixels around the pixel of interest, but is not limited to this.

<Processing Procedure by Quantization Condition Control Unit and Error Diffusion Unit>

Figure 4:
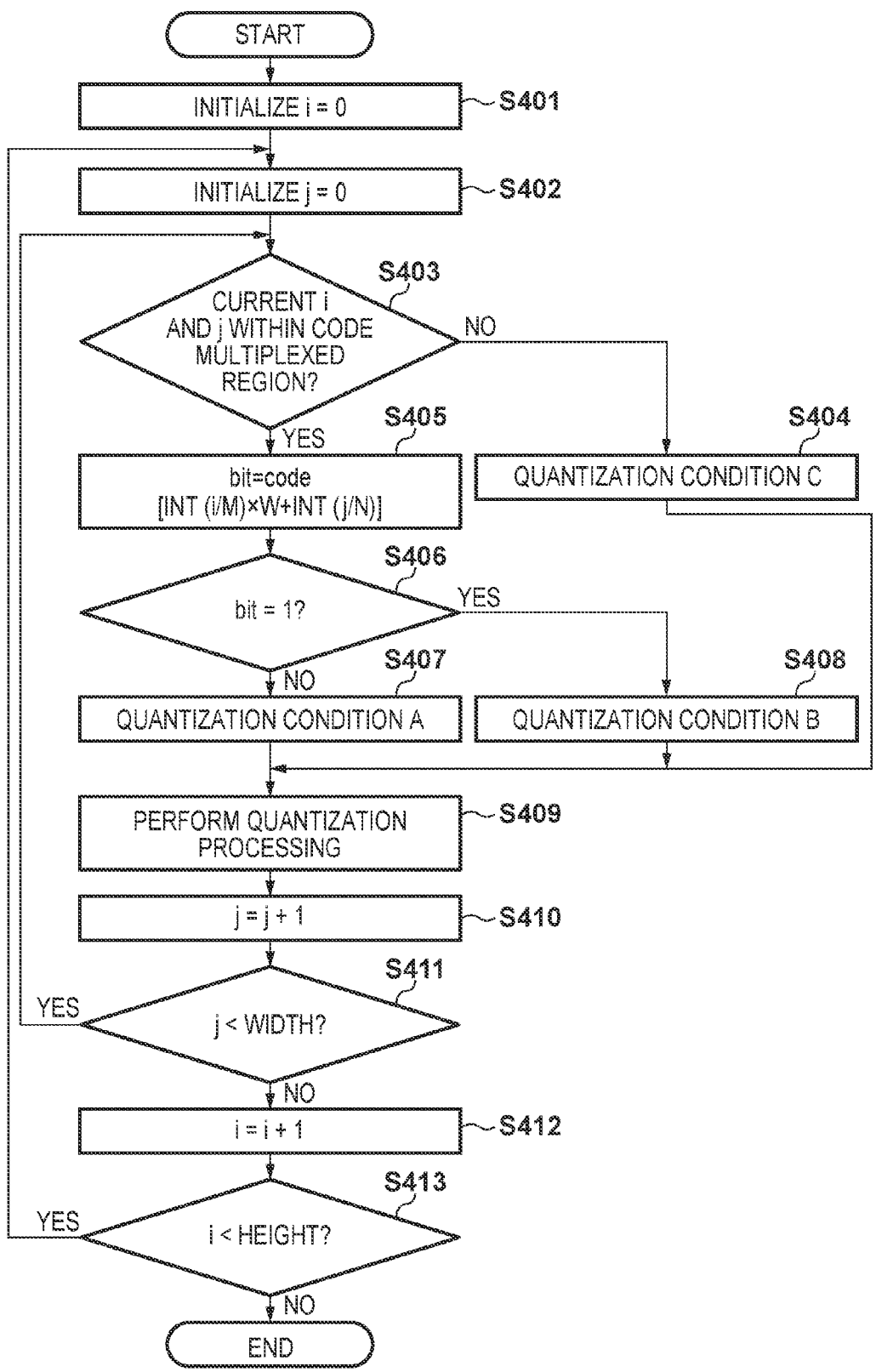
FIG. 4 is a flowchart showing the operation procedure of printed material creation.

The operation procedure of overall processing including the quantization condition control unit 202 will be described next with reference to the flowchart of FIG. 4. An example in which the quantized value is binary will be described. Note that the flowchart of FIG. 4 is implemented when the CPU 211 loads a program associated with the flowchart and executes it.

In step S401, the control unit 210 initializes a variable i to 0. The variable i counts the vertical address of a processing target pixel, that is, a pixel of interest.

In step S402, the control unit 210 initializes a variable j to 0. The variable j counts the horizontal address of the pixel of interest. Note that in the following processing, the initial value of the variables i and j and the scanning direction are not limited to those described here if all pixel positions on a print image can be scanned.

In step S403, the control unit 210 determines whether the coordinates (i, j) representing the address of the current pixel of interest belong to a multiplexing region where multiplexing processing should be executed.

A multiplexing region will be described with reference to FIG. 5. FIG. 5 illustrates one image in which the horizontal pixel count is WIDTH and the vertical pixel count is HEIGHT. The upper left corner of the image is defined as an origin, and the image is segmented into blocks each including N pixels in the horizontal direction×M pixels in the vertical direction. In this embodiment, block formation is performed using the origin as a reference point. However, a point spaced apart from the origin may be set as a reference point. When multiplexing maximum information on this image, blocks each including N×M pixels are arranged from the reference point. That is, letting W be the number of blocks that can be arranged in the horizontal direction, and H be the number of blocks that can be arranged in the vertical direction, the following relations are obtained.

$$W = \text{INT}(\text{WIDTH}/N) \quad (1)$$

$$H = \text{INT}(\text{HEIGHT}/M) \quad (2)$$

where INT( ) is the integer part of the value in H.

The remainder numbers of pixels indivisible in equations (1) and (2) are equivalent to an end portion when the blocks each including N×M pixels are arranged. The end portion is located outside the region where additional information is multiplexed, that is, outside the code multiplexing region. In step S403 of FIG. 4, if the pixel of interest is located in a rectangular region with W×N pixels in the horizontal direction×H×M pixels in the vertical direction, it is determined that the pixel of interest is located in the code multiplexing region. Otherwise, it is determined that the pixel of interest is located outside the code multiplexing region. N and M represent the size of a block formed by the block formation unit 201, and WIDTH and HEIGHT represent the size of image data (that is, image data on which additional information is multiplexed) to be processed.

Upon determining that the pixel of interest currently under processing is located outside the multiplexing region in step S403, the control unit 210 sets a quantization condition C in step S404. In contrast, upon determining that the pixel of interest currently under processing is located in the multiplexing region, in step S405, the control unit 210 loads additional information to be multiplexed. For descriptive convenience, assume that the additional information is expressed bit by bit using an array code[ ]. For example, assuming that the additional information is 48-bit information, the array code[ ] stores respective bits in code[0] to code[47]. In step S405, information in the array code[ ] is substituted into a variable bit as follows.

$$\text{bit} = \text{code}[\text{INT}(i/M) \times W + \text{INT}(j/N)] \quad (3)$$

where the index on the right-hand side of equation (3) represents the order of a block arranged in the raster order. By equation (3), each bit of the additional information is associated with each block of the image data to be processed. Hence, the number of bits of the additional information code is equal to or less than W×H, and is preferably equal to W×H. For example, in FIG. 5, the number of blocks is 4×6=24. When the code has 48 bits, the image data is preferably segmented into, for example, 8×6=48 blocks.

Subsequently, in step S406, the control unit 210 determines whether the variable bit substituted in step S405 is "1". As described above, since information in the array code[ ] is stored bit by bit for each array element, the value of the variable bit also indicates either "0" or "1".

Upon determining in step S406 that the value of the variable bit is "0", the control unit 210 sets a quantization condition A in step S407. Upon determining that the value of the variable bit is "1", the control unit 210 sets a quantization condition B in step S408. In step S409, the control unit 210 performs quantization processing based on the set quantization condition. Note that the processing of step S409 may be done by the error diffusion unit 200. The quantization processing corresponds to the error diffusion method described with reference to FIG. 3.

In step S410, the variable j in the horizontal direction is incremented by one. In step S411, the control unit 210 determines whether the number of pixels of interest after the increment is smaller than the horizontal pixel count WIDTH. The above-described processing is repeated until the number of processed pixels reaches WIDTH. When the processing in the horizontal direction is performed as many times as the horizontal pixel count WIDTH, in step S412, the variable i in the vertical direction is incremented by one. In step S413, the control unit 210 determines whether the number of pixels of interest after the increment is smaller than the vertical pixel count HEIGHT. The above-described processing is repeated until the number of processed pixels reaches HEIGHT.

With the above-described operation procedure, the quantization condition can be changed in accordance with additional information for each block including N×M pixels.

<Quantization Condition>

An example of the quantization conditions A, B, and C will be described next. The quantization condition in the error diffusion method has various factors. In the first embodiment, the quantization condition is a quantization threshold. When the quantization condition C is selected, any value is usable as the quantization threshold because the pixel of interest is located outside the multiplexing region. As described above, when the tone of one pixel is expressed by 8 bits, and the quantization level is binary, the maximum value "255" and the minimum value "0" are quantization representative values. An intermediate value "128" is often set as the quantization threshold. That is, the quantization condition C is a condition that the quantization threshold is fixed to "128". When the quantization condition A or B is used, it is necessary to make a difference in image quality depending on the quantization condition because the pixel of interest belongs to a block in the multiplexing region. However, the difference in image quality needs to be expressed such that it can hardly be discriminated to vision but can easily be identified on paper.

FIGS. 6A and 6B show an example of the quantization conditions A and B. FIG. 6A is a view showing the period of a change of the quantization threshold in the quantization condition A. In FIG. 6A, one square indicates one pixel, a white square indicates a fixed threshold ($\theta 2$), and a hatched square indicates a variable threshold ($\theta 1$) ($\theta 2 > \theta 1$). That is, in the example of FIG. 6A, a matrix of eight pixels in the horizontal direction and four pixels in the vertical direction is formed. An excessive value is set as a threshold only for a hatched square. FIG. 6B is a view showing the period of a change of the quantization threshold in the quantization condition B. In the example of FIG. 6B, a matrix of four pixels in the horizontal direction and eight pixels in the vertical direction is formed, unlike FIG. 6A. An excessive value is set as a threshold only for a hatched square.

When using such a quantization threshold matrix in step S409, a quantization threshold corresponding to the pixel position (i, j) is specified in the following way. That is, when a quantization threshold matrix set for a block is two-dimensionally repetitively arranged in a block to which the pixel position (i, j) belongs, an element (quantization threshold) of the quantization threshold matrix corresponding to the pixel position (i, j) is specified. The above-described error diffusion processing is performed for the pixel position (i, j) using the specified quantization threshold.

As described above, when one pixel is expressed by an 8-bit tone value, for example, "128" is set as the fixed threshold $\theta 2$, and "10" is set as the excessive value $\theta 1$. When the quantization threshold lowers, the quantized value of a pixel of interest readily becomes "1" (quantization representative value "255"). That is, in both FIGS. 6A and 6B, the quantized values "1" easily line up in the arrangement of hatched squares. In other words, blocks in which dots are generated in the arrangement of hatched squares in FIG. 6A, and blocks in which dots are generated in the arrangement of hatched squares in FIG. 6B coexist for every block of N×M pixels.

In the error diffusion method, a small change of the quantization threshold does not greatly affect the image quality. In the ordered dither method, the image quality of tone expression greatly depends on a dither pattern to be used. However, in the error diffusion method that periodically gives a change of the quantization threshold, as described above, the tone expression that determines the image quality is only the error diffusion method. For this reason, even if the dot arrangement changes a little or texture generation changes, it hardly affects the image quality of tone expression. This is because even if the quantization threshold changes, an error that is the difference between a signal value and a quantized value is diffused to the peripheral pixels, and the input signal value is saved macroscopically. That is, redundancy is very large concerning the dot arrangement and texture generation in the error diffusion method. In a case of image data, quantization is performed for each color component in accordance with the above-described procedure.

In the above description, multiplexing is implemented by superimposing a predetermined periodic component (or periodicity) representing a code on a quantization threshold of the error diffusion method. However, the following methods are also conceivable:

a method of directly superimposing a periodicity on brightness information of R, G, and B a method of dividing brightness information of R, G, and B into brightness-color difference information (for example, Y, Cr, and Cb signals) and multiplexing a periodicity a method of dividing brightness information of R, G, and B into ink colors (for example, C, M, Y, and K signals) and multiplexing a periodicity Periodicity multiplexing may be done using a quantization threshold, as described above.

<Arrangement of Additional Information Demultiplexing Unit>

Figure 7:
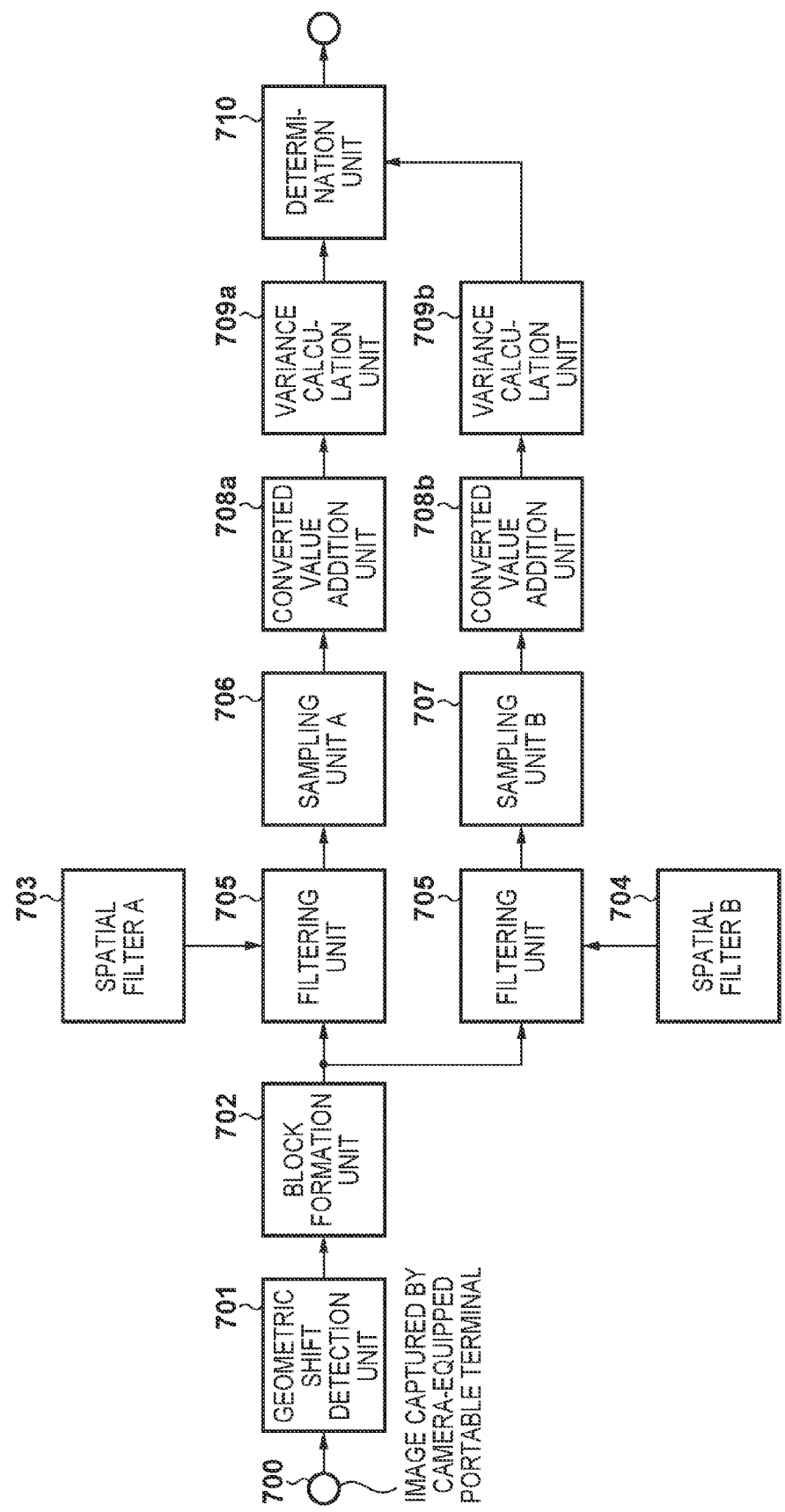
FIG. 7 is a block diagram showing the main part of the additional information demultiplexing unit.

The additional information demultiplexing unit 106 in the image processing system shown in FIG. 1B will be described next. FIG. 7 is a block diagram showing the arrangement of the additional information demultiplexing unit 106. For descriptive convenience, an example in which additional information is demultiplexed from a printed product on which the additional information is multiplexed bit by bit for each divided block will be described, as in the example of the above-described additional information multiplexing unit 102. Needless to say, the additional information amount per block in the multiplexing unit equals the demultiplexing information amount per block in the demultiplexing unit.

Image information read by the camera-equipped portable terminal 104 is input from an input terminal 700. The resolution of the imaging sensor of the camera-equipped portable terminal 104 to be used is preferably equal to or higher than the resolution of a printer that creates a printed product. To correctly read scattering information of dots on a printed product, the resolution on the imaging sensor side needs to be at least twice higher than that on the printer side according to the sampling theorem, as a matter of course. However, if the resolution is equal or higher, scattering of dots can be determined to some extent though it may be inaccurate. Hence, in the first embodiment, the resolution of the printer and that of the imaging sensor are assumed to be equal for descriptive convenience.

A geometric shift detection unit 701 detects a geometric shift of an image captured by the camera-equipped portable terminal 104. Since the processing target image has undergone output processing by the printer and shooting (capturing) processing by the camera-equipped portable terminal 104, the image information input from the input terminal 700 may greatly geometrically shift from the image information before printer output. Hence, the geometric shift detection unit 701 detects the boundary between the printed product and a region other than the printed product by edge detection.

Figure 8:
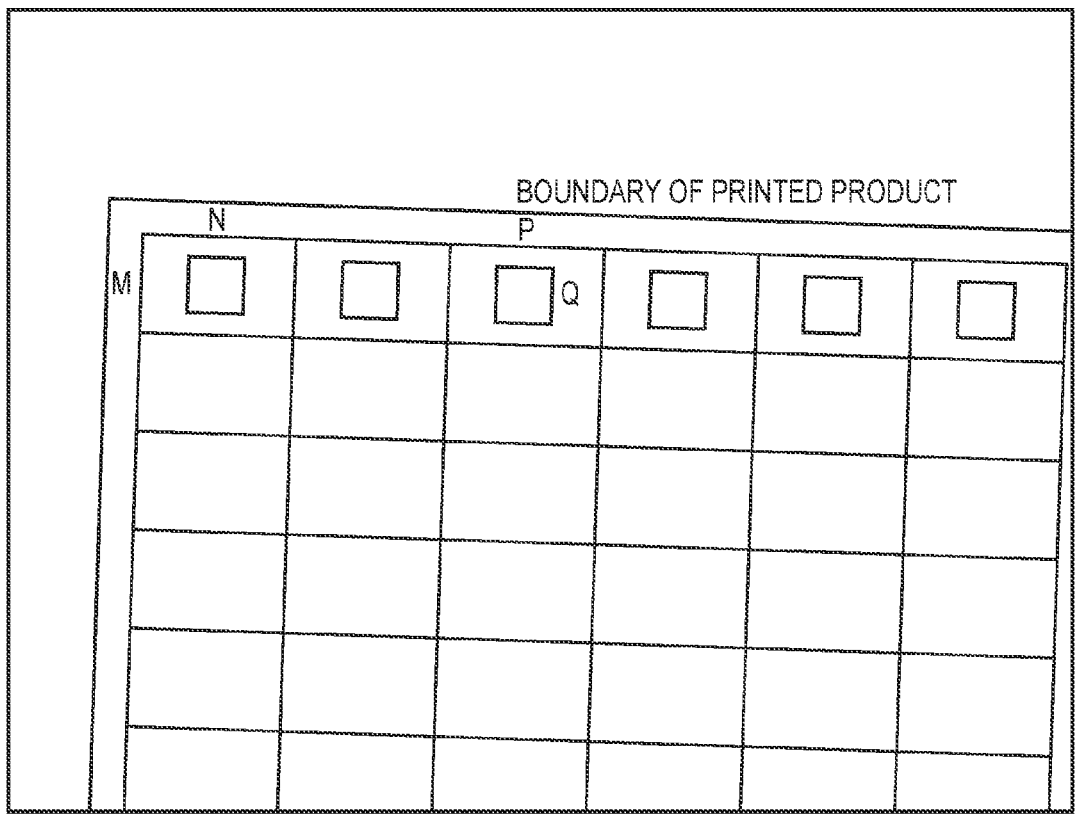
FIG. 8 is a view for explaining inclination of an image in a shot image.

FIG. 8 is a view showing a shot image input from the input terminal 700. If the printer resolution and the imaging sensor resolution are equal, a large factor to be corrected is the rotation direction (tilt) of an image caused by, for example, a skew during printing on paper by the printer or a shift that occurs when the camera-equipped portable terminal 104 is held over the printed product. Hence, by detecting the boundary of the printed product, the degree and direction of rotation in which the shift occurs can be determined. The shift amount can be represented by, for example, the number of pixels shifted in the vertical direction with respect to a predetermined number of pixels in the horizontal direction.

A block formation unit 702 segments the image information into blocks each including P pixels in the horizontal direction×Q pixels in the vertical direction. This block needs to be smaller than a block of N×M pixels at the time of superimposing a digital watermark. That is, $$P \leq N \text{ and } Q \leq M \quad (4)$$

hold.

Block formation of every P×Q pixels is performed at a predetermined interval. That is, block formation is performed such that one block of P×Q pixels is included in a region assumed to be a block of N×M pixels at the time of multiplexing. That is, the pitch of blocks is based on N pixels in the horizontal direction and M pixels in the vertical direction. In this case, the gaps between the blocks correspond to (N−P) pixels in the horizontal direction and (M−Q) pixels in the vertical direction. However, a shift exists between the original image and the captured image, as described above. Hence, the shift amount detected by the geometric shift detection unit 701 needs to be converted into a shift amount per block and added to the number of skipped pixels to do correction. For example, when determining a P×Q block on the right side of a certain P×Q block, the P×Q block is not determined by simply setting N pixels to the pitch in the horizontal direction. Instead, a shift in the vertical direction in a case in which the block is moved by N pixels rightward is obtained from the detected shift amount. The P×Q block is ensured based on a position shifted by the number of pixels in the vertical direction.

Spatial filters 703 and 704 have different characteristics. Each filtering unit 705 performs digital filtering of calculating the sum of products for the peripheral pixels. The coefficients of the spatial filters 703 and 704 are created adaptively to the period of the variable threshold of the quantization condition at the time of multiplexing. Assume that the multiplexing unit 102 multiplexes additional information on image data using the two types of quantization thresholds shown in FIGS. 6A and 6B in accordance with the value of the additional information. FIGS. 9A and 9B show examples of the spatial filter A 703 and the spatial filter B 704 used by the demultiplexing unit 106 at that time. In FIGS. 9A and 9B, the center of 5×5 pixels is a pixel of interest, and the remaining 24 pixels are peripheral pixels. The pixel of each blank portion in FIGS. 9A and 9B represents that the filter coefficient is "0". As is apparent, FIGS. 9A and 9B show edge enhancement filters. In addition, the directionality of the edge to be enhanced matches the directionality of the variable threshold used in multiplexing (more specifically, the directionality in which black pixels readily line up). That is, the coefficients are created such that FIG. 9A matches FIG. 6A, and FIG. 9B matches FIG. 6B.

Sampling units 706 and 707 perform processing of sampling, based on certain regularity, a signal (to be referred to as a converted value hereinafter) after filtering in a block of P×Q pixels. In the first embodiment, the regularity of a pixel position to be specified is divided into a periodicity and a phase and processed. That is, the sampling units 706 and 707 specify pixel positions in different periodicities, and execute a plurality of sampling processes while changing the phase. The sampling method will be described later.

Converted value addition units 708 add the converted values of pixel positions sampled by the sampling units 706 and 707 for each phase. The sampling processing and the converted value addition processing correspond to extracting power of a predetermined frequency vector enhanced by the spatial filters 703 and 704. A frequency vector is a set of frequency components in the horizontal and vertical directions of an image, and represents the two-dimensional frequency characteristic of the image.

Variance calculation units 709 calculate the variances of a plurality of values added for the respective phases in the respective periodicities.

A determination unit 710 determines a multiplexed code based on the variances in the respective periodicities.

Figure 10:
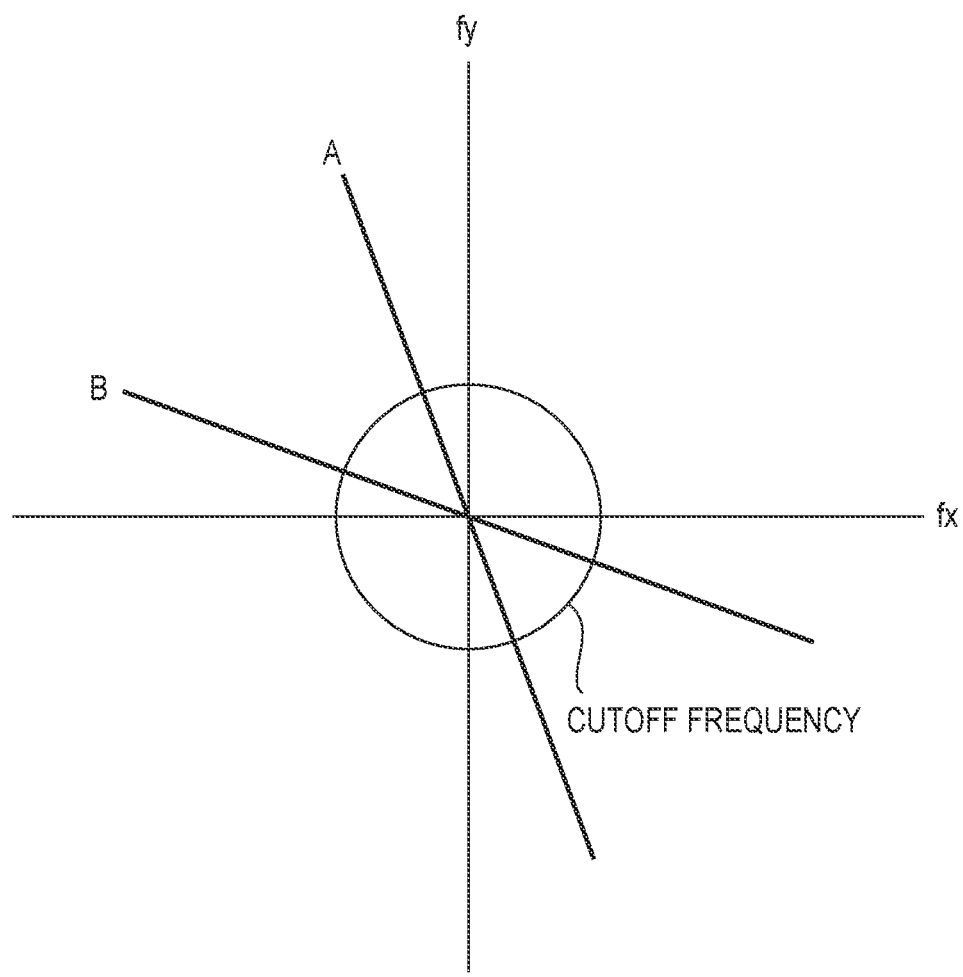
FIG. 10 is a view for explaining a frequency domain.

FIG. 10 is a view showing an outline of the first embodiment in a two-dimensional frequency domain. The abscissa represents the frequency in the horizontal direction, and the ordinate represents the frequency in the vertical direction. The origin at the center indicates a DC component. The frequency rises as it moves apart from the origin. A circle in FIG. 10 indicates a cutoff frequency by error diffusion. The filter characteristic of the error diffusion method represents the characteristic of an HPF (High Pass Filter) that cuts off a low-frequency region. The frequency to be cut off changes in accordance with the density of a target image. When the quantization threshold changes, a frequency characteristic generated after quantization changes. In an image quantized using the quantization threshold shown in FIG. 6A, a large power spectrum is generated in a frequency vector on a line A in FIG. 10. In an image quantized using the quantization threshold shown in FIG. 6B, a large power spectrum is generated in a frequency vector on a line B in FIG. 10. That is, when "128" is set as a threshold in each white portion of the threshold matrix in FIG. 6A, and "10" is set as a threshold in each hatched portion, the hatched portions readily become black pixels. Hence, in an image quantized using the threshold matrix, probably, a frequency characteristic having a period of an integer multiple of four pixels readily appears in the vertical direction, and a frequency characteristic having a period of an integer multiple of eight pixels, that is, a reciprocal readily appears in the horizontal direction. That is, a power spectrum of a frequency vector in which the frequency in the vertical direction is almost twice higher than the frequency in the horizontal direction is detected from the image quantized using the threshold matrix shown in FIG. 6A. In FIG. 6B, the horizontal direction and the vertical direction replace each other as compared to FIG. 6A. When demultiplexing additional information, detection of a frequency vector on which a large power spectrum is generated leads to determination of a multiplexed signal. It is therefore necessary to individually enhance and extract frequency vectors.

The spatial filters shown in FIGS. 9A and 9B correspond to HPFs each having the directionality of a specific frequency vector. That is, the spatial filter shown in FIG. 9A can enhance the frequency vector on the line A, and the spatial filter shown in FIG. 9B can enhance the frequency vector on the line B. For example, assume that a large power spectrum is generated on the frequency vector on the line A in FIG. 10 by applying the quantization condition shown in FIG. 6A. At this time, the power spectrum on the line A is amplified by the spatial filter shown in FIG. 9A but is hardly amplified by the spatial filter shown in FIG. 9B. That is, when a plurality of spatial filters perform filtering in parallel, the power spectrum is amplified only by a spatial filter coincident with the frequency vector, and is hardly amplified by other filters. Thus, a frequency vector on which a large power spectrum is generated can easily be known.

<Processing Procedure by Additional Information Demultiplexing Unit 106>

Figure 11:
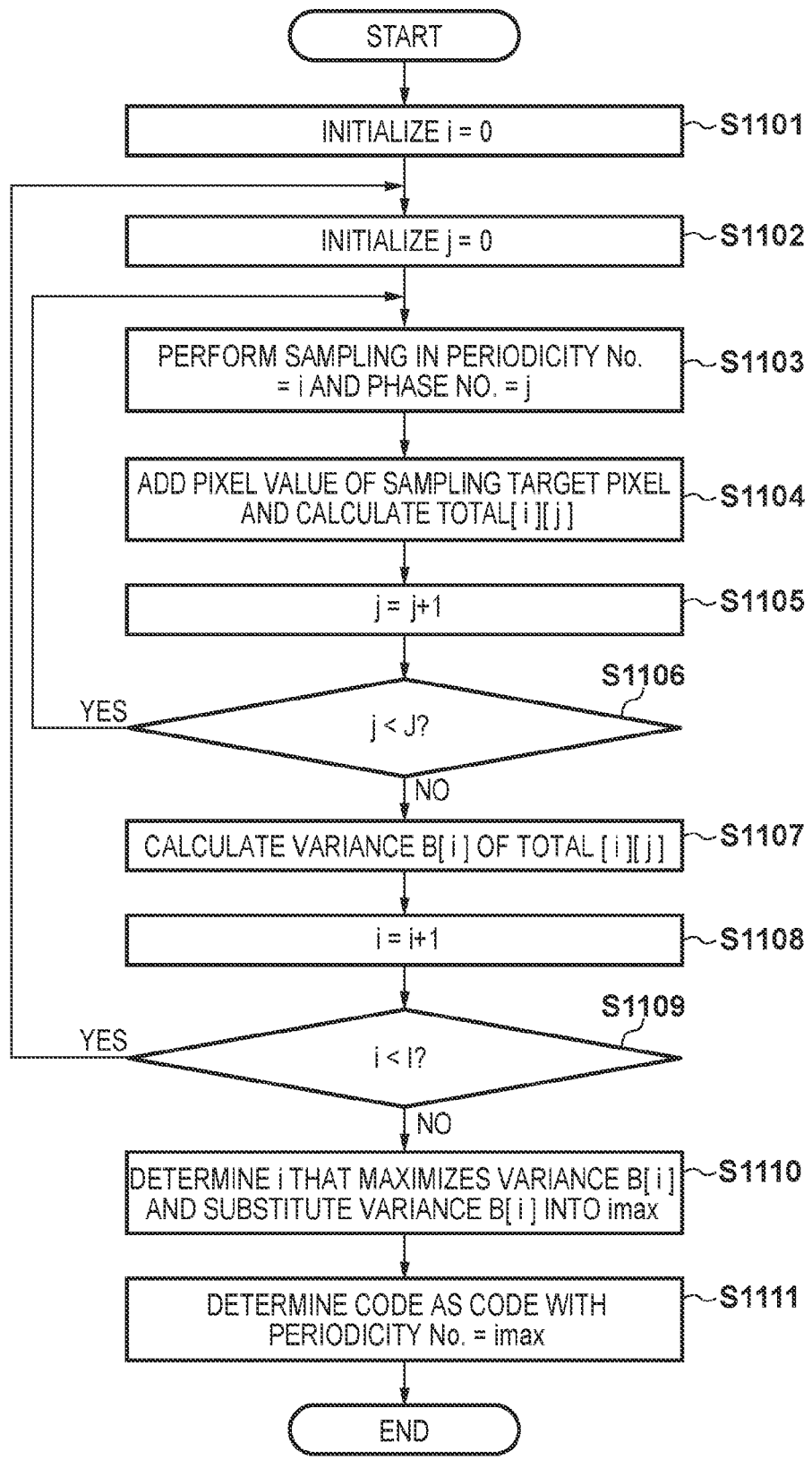
FIG. 11 is a flowchart showing the operation procedure of digital watermark decoding.

FIG. 11 is a flowchart showing the operation procedure of the sampling units 706 and 707, the converted value addition units 708, the variance calculation units 709, and the determination unit 710 shown in FIG. 7. The procedure shown in FIG. 11 is executed by constituent elements shown in FIG. 7. More specifically, step S1103 is executed by the sampling unit 707, step S1104 is executed by the converted value addition units 708, step S1107 is executed by the variance calculation units 709, and steps S1110 and S1111 are executed by the determination unit 710. Parameter setting processing and determination processing between these steps may be performed by a control unit (not shown). The value of periodicity No. to be described with reference to FIG. 11 corresponds to the sequence of processing blocks from the sampling unit 707 to the variance calculation units 709. In FIG. 7, the number of periodicity Nos. is two, that is, 0 and 1. That is, in FIG. 11, processes are executed in series while changing the value of the periodicity No. i. However, if the processing is implemented by hardware, as shown in FIG. 7, processes corresponding to different periodicity Nos. are executed in parallel. For this reason, when the procedure shown in FIG. 11 is executed by the arrangement shown in FIG. 7, steps S1108 and S1109 concerning the parameter i need not always be performed.

Note that the processing shown in FIG. 11 may be performed by executing a program configured to implement the overall procedure shown in FIG. 11 by a processor such as a CPU or a controller (not shown). In the following explanation, the additional information demultiplexing unit 106 is the entity of the operation.

In FIG. 11, in steps S1101 and S1102, variables are initialized. The values of the variables i and j used in the procedure are initialized to 0.

Step S1103 is a step of determining the factors of the regularity of pixel positions to be sampled by the sampling units 706 and 707, that is, two factors "periodicity" and "phase". In this procedure, let i be the variable concerning the periodicity, and j be the variable concerning the phase.

The conditions of the phase and periodicity are managed by numbers. The factors of a sampling method in which a periodicity number (to be abbreviated as No. hereinafter) is i, and a phase No. is j are set. This example will be described with reference to FIGS. 12 and 13. By the factors, the position of a processing target converted value in image data is specified. Note that i and j are indices representing the periodicity and phase, respectively, and will be sometimes referred to as the periodicity i and the phase j hereinafter. In the arrangement shown in FIG. 7, that is, when the value of the variable i is "0", the sampling unit A 706 performs sampling processing for a block from a filtering unit 705a by a sampling method based on the factors of a sampling method in which the periodicity No. is i, and the phase No. is j. On the other hand, when the value of the variable i is "1", the sampling unit B 707 performs sampling processing for a block from a filtering unit 705b by a sampling method based on the factors of a sampling method in which the periodicity No. is i, and the phase No. is j.

Step S1104 is a step in which the converted value addition unit 708 adds the converted value at the position specified in the block. The added value is stored as a variable array TOTAL[i][j]. Normally, a plurality of pixels (converted values) are specified in accordance with the parameters i and j. Hence, in step S1104, the converted value addition unit 708 obtains the sum of converted values at the specified positions and stores it in TOTAL[i][j]. If the value of the variable i is "0", a converted value addition unit 708a obtains the sum of the pixel values of pixels in a block that has undergone sampling processing by the sampling unit A 706, and registers the obtained sum in the array TOTAL[i][j]. On the other hand, if the value of the variable i is "1", a converted value addition unit 708b obtains the sum of the pixel values of pixels in a block that has undergone sampling processing by the sampling unit B 707, and registers the obtained sum in the array TOTAL[i][j].

In step S1105, the control unit increments the variable j. In step S1106, the control unit compares the variable j with a fixed value J. J stores a predetermined number of times to perform the sampling processing while changing the phase. If the variable j is smaller than J, the process returns to step S1103 to repeat the sampling processing and the addition processing of a pixel (that is, a converted value) at a sampled position based on the new phase No. according to the incremented variable j. If the value of the index j changes, the pixel position to be sampled also changes.

When the sampling processing and the addition processing are performed based on the shifted phase the set number of times, in step S1107, the variance calculation unit 709 calculates a variance B[i] of the addition result TOTAL[i][j]. That is, the degree of variation of each addition result caused by a phase difference is evaluated. Here, i is fixed, and the variances of J results TOTAL[i][j] from 0 to (J−1) concerning the index j are obtained. The variance is B[i]. Note that when executing step S1107 by the arrangement shown in FIG. 7, if the value of the variable i is "0", a variance calculation unit 709a obtains the variance of the array TOTAL[i][j]. That is, the degree of variation of each sum registered in the array TOTAL[i][j] caused by a phase difference is evaluated. The variance calculation unit 709a registers the obtained variance in the array B[i]. On the other hand, if the value of the variable i is "1", a variance calculation unit 709b obtains the variance of the array TOTAL[i][j], and registers the obtained variance in the array B[i].

In step S1108, the control unit increments the variable i. In step S1109, the control unit compares the variable i with the fixed value I. I stores the number of times of performing sampling processing while changing the periodicity. If the variable i is smaller than I, the process returns to step S1102 to repeat the sampling processing, the converted value addition processing, and variance calculation using a new periodicity No. condition according to the incremented variable i. The variance indicates a variation of the average value of values "1" (or the maximum pixel value such as 255) to a pixel corresponding to a specific phase index. The smaller the variation is, the smaller the variance is. The larger the variation is, the larger the variance is.

If the control unit determines in step S1109 that i reaches the set count, I variances B[i] can be calculated. In step S1110, the determination unit 710 determines the maximum value of the variance from the set of I variances, and substitutes the value i at this time into a variable imax.

In step S1111, the determination unit 710 determines a code. A code whose periodicity No. is imax is determined as a multiplexed code, and the processing ends. However, if no power spectrum appears upon filtering processing for the image on in the block, preferably, it is determined that the decoding process that is currently being executed is not a decoding process corresponding to the multiplexing method, and decoding fails, and the processing is ended. In contrast, if a power spectrum appears, it can be determined that decoding succeeds. This determination can be implemented by determining whether, for example, B[imax] meets a predetermined condition. As the predetermined condition, a condition that, for example, B[imax] is equal to or larger than a predetermined threshold can be employed. However, since the variance B is not a normalized value, a fixed threshold may be inappropriate. Hence, in step S1111, for example, a maximum possible variance Bmax is obtained and B[imax]/Bmax is compared with a predetermined threshold. If B[imax]/Bmax is smaller than the threshold, it is determined that the decoding fails, and the processing may be ended. Instead of performing determination in one block, the decoding may be determined to fail when the condition is not met in a predetermined number of continuous blocks. Note that the variance Bmax can be obtained by, for example, the following procedure. That is, for an image in which a pixel value (converted value) at a position corresponding to a specific phase No. is set to "1" (or the maximum pixel value such as 255), and other pixel values are set to "0", a variance is obtained according to the procedure shown in FIG. 11, and the value of the variance is defined as Bmax. The value is stored and prepared in association with each quantization threshold matrix. This makes it possible to normalize B[imax]/Bmax such that it takes a value between 0 and 1 and compare it with a fixed threshold. Note that this threshold is experimentally decided.

An example in which I=2 and J=4 will be described. FIGS. 12 and 13 show pixel position specifying methods in a case in which the block size is defined by P=Q=16. Referring to FIGS. 12 and 13, one square in the blocks corresponds to one pixel. In FIGS. 12 and 13, the blocks have a square shape in which P=Q. However, the blocks need not always have a square shape and may have a shape other than a rectangle.

FIG. 12 shows a sampling method (corresponding to the sampling unit A 706 in FIG. 7) in periodicity No.=0. FIG. 13 shows a sampling method (corresponding to the sampling unit B 707 in FIG. 7) in periodicity No.=1. In FIGS. 12 and 13, a value added to each pixel in the blocks indicates a pixel corresponding to the phase No. j. The parameter j represents a phase. Since a pixel position as a sampling target in a pixel block is specified by a periodicity and a phase, a pixel at a position to be specified is marked with the value of the phase No. j in FIGS. 12 and 13. For example, a pixel indicated by "0" corresponds to a pixel at a position specified as a sampling target when j=0. That is, there are four types of phases in both FIGS. 12 and 13 which correspond to pixel specifying methods in a case in which the phase No. j is 0 to 3. That is, the matrix shown in FIG. 12 or 13 is specified in accordance with the value of the periodicity No., and the position of a pixel in the specified matrix is specified in accordance with the value of the phase No.

The periodicities of pixel positions corresponding to the same phase index (phase No.) shown in FIGS. 12 and 13 match the periodicity in FIG. 6A and the periodicity in FIG. 6B, respectively. As described above, in both FIGS. 6A and 6B, quantized values "1" (in binary expression using "0" and "1") readily line up in the arrangement of hatched squares. For this reason, in a block for which, for example, the quantization condition A is set upon multiplexing, the quantized values "1" easily line up at the periodicity shown in FIG. 6A. When filtering is performed using a spatial filter adapted to the periodicity, the frequency component is further amplified. Hence, the quantized values "1" concentrate to pixels at positions corresponding to a specific phase index. If converted values are specified based on the periodicity shown in FIG. 12 and added, the variance of the addition result becomes large.

In contrast, if filtering using an inadequate spatial filter is performed for the block for which the quantization condition A is set, and pixel positions are specified based on the periodicity shown in FIG. 13, the variance of the addition result of converted values becomes small. That is, since the periodicity of the quantized values and the periodicity of the specified pixel positions are different, the added value of converted values by the phase difference between the specified pixel positions is average, and the variation is small. On the other hand, in a block for which the quantization condition B is set upon multiplexing, the variance in small in FIG. 12, and large in FIG. 13.

The example of the flowchart shown in FIG. 4 is applied. In this case, bit=0 is set to the quantization condition A, and bit=1 is set to the quantization condition B. Hence, if the variance of the periodicity No.=0 is large (that is, if imax=0), it can be determined that bit=0. In contrast, if the variance of the periodicity No.=1 is large (that is, if imax=1), it can be determined that bit=1. That is, by associating the quantization condition, the spatial filter characteristic, and the periodicity of the condition to specify a pixel position, multiplexing and demultiplexing between an image and a code can easily be implemented. In this embodiment, two types of periodicities "0" and "1" are used, and a multiplexed code in a block is a 1-bit code. However, a multiplexed code may have more bits, as a matter of course. Needless to say, the type of the quantization condition, the type of the spatial filter, and the type of the periodicity No. (value I) of the pixel position specifying condition match each other.

As is apparent from the above explanation, the predetermined value J in the procedure shown in FIG. 11 represents the number of types of code information highly probably multiplexed on image data. The predetermined value I represents the number of phases that can be taken in one period. In this example, since the phase is a discrete value for each pixel, the number of pixels in one period may be represented by the value I.

In this embodiment, a code can easily be demultiplexed without comparing the power value of a frequency corresponding to the regularity of a quantization condition by orthogonal transformation. In addition, since the processing is performed in the real space domain, demultiplexing processing can be implemented very fast.

The quantization conditions A and B, the spatial filters A and B, and the sampling units A 706 and B 707 are merely examples, and are not limited to those described above. That is, another periodicity may be given, and the number of taps of the spatial filter, the block size of sampling, and the like may be larger or smaller than in the above-described example.

The procedure shown in FIG. 11 is applied to each block shown in FIG. 5, and a code corresponding to the quantization condition of each block is determined. Then, for example, the W×H codes are arranged in the order of blocks, thereby reproducing the embedded code information. In this example, for example, the quantization condition A corresponds to "0", and the quantization condition B corresponds to "1". These codes are arranged in the order of blocks, thereby reproducing original code information. Note that when ($2^n$+1) different quantization conditions (that is, quantization threshold patterns) are prepared, and $2^n$ quantization conditions out of them are associated with n-bit code words, n-bit code information per block can be multiplexed.

If a multiplexed code can be specified by performing the procedure shown in FIG. 11 in one direction, the procedure shown in FIG. 11 is executed only in one direction of the image. For example, the quantization conditions (that is, code patterns) shown in FIGS. 6A and 6B can be discriminated by executing the procedure shown in FIG. 11 in one direction. However, if a multiplexed code cannot be narrowed down to one code only in one direction, the procedure may be executed in each of the horizontal and vertical directions. The value imax may be decided independently for each direction, and after that, the value imax may finally be decided by combining the values. For example, if the plurality of variances B[i] are almost the same in one direction, variances whose differences from the maximum variance are equal to or less than a predetermined value are selected as maximum value candidates. The periodicity indices i of the candidate variances are left as candidates of imax. Candidates of imax are decided for both of the horizontal and vertical directions, and the periodicity index i common to both directions is decided as final imax. A code associated with the index value imax is determined as a code multiplexed on the image.

The procedure shown in FIG. 11 can translate to a procedure of obtaining the correlation between image information and the pixel pattern of additional information or a procedure of determining the correlation between a pixel value distribution and a threshold matrix in each block and extracting information corresponding to the threshold matrix. That is, the level of the correlation between image information on which additional information is multiplexed and a pixel pattern corresponding to each bit or bit group of the multiplexed additional information (a pattern corresponding to a quantization threshold) is obtained. If the correlation is lower than a predetermined level, the decoding is determined to fail. If the correlation is equal to or higher than the predetermined level, it is determined that the bit or bit group corresponding to the correlated pixel pattern is multiplexed. This means that multiplexed additional information can be decoded by executing not the procedure shown in FIG. 11 but the above-described procedure of obtaining a correlation. The procedure can also be regarded as a method of determining, for each block of an image with multiplexed additional information, the level of matching between the spatial frequency of image information included in the block and the spatial frequency of the pattern of a quantization threshold matrix, and if the level of matching is equal to or more than a predetermined level, decoding a code corresponding to the quantization threshold matrix.

In the first embodiment, a code can easily be demultiplexed without comparing the power value of a frequency corresponding to the regularity of a quantization condition by orthogonal transformation. In addition, since the processing is performed in the real space domain, demultiplexing processing can be implemented very fast.

The first embodiment has been described above. The quantization conditions A and B, the spatial filters A and B, and the pixel specifying units A and B are merely examples, and are not limited to those described above. Another periodicity may be given, and the number of taps of the spatial filter, the block size used to specify a pixel pattern, and the like may be larger or smaller than in the above-described example.

To easily explain the idea of the present invention, the operation procedure shown in FIG. 11 has been described as iterative processing of the variable i that is the periodicity No. and the variable j that is the phase No. In actuality, iterative processing using a pixel address in a block of P×Q pixels can be implemented more easily. That is, two kinds of information, that is, the periodicity No. and the phase No. are stored in advance as tables in correspondence with each pixel address in a block, as shown in FIGS. 12 and 13, and converted values are added for each of the variables of the corresponding periodicity No. and phase No. With this method, the added values of the sets of periodicity Nos. and phase Nos. can be calculated in parallel only by processing P×Q pixels.

In the operation procedure shown in FIG. 11, the variances of the addition results of converted values at specified positions after the spatial filters are calculated, and the variances are compared to determine a code. However, the method is not limited to this. A method of comparing evaluation functions without using variances is also usable. If the addition results of converted values at specified positions localize, the values are readily noticeable only for one phase when the phase is shifted. Hence, evaluating the "degree of variation" suffices.

For example, to evaluate the degree of variation, the following evaluation functions can be considered in addition to variances.

1. The difference between the maximum value and the minimum value of values obtained by adding converted values at specified positions 2. The difference between the maximum value and the second largest value of values obtained by adding converted values at specified positions or the difference between the minimum value and the second smallest value 3. The maximum value of the differences between consecutive values in a histogram created by values obtained by adding converted values at specified positions.

The evaluation functions 1, 2, and 3 represent absolute difference values. The relative ratio of one of the difference values to a converted value, a pixel value, or the sum of converted values can also be used as an evaluation function. A binary quantized value has been described above as an example. However, the quantized value is not limited to this.

As described above, according to the first embodiment, the quantization condition is changed for each block formed from M×N pixels, and an image is quantized in accordance with the quantization condition, thereby embedding predetermined information in the image. Consequently, as compared to a conventional information embedding method, for example, a method of embedding information by orthogonal transformation, information can be embedded in an image such that degradation in image quality can be suppressed, and the embedded information can accurately be extracted at a high speed.

[Continuous Shooting of Multiplexed Printed Product]

Continuous shooting of a printed product (to be referred to as a multiplexed printed product hereinafter) with multiplexed additional information by the camera-equipped portable terminal 104 will be described next. At the time of shooting, a plurality of stationary degradations occur in the camera-equipped portable terminal 104 depending on a shooting condition (or an image capturing condition). Note that a stationary degradation is, for example, a degradation that occurs at a predetermined position in an image shot under a predetermined shooting condition. The cause or type of the degradation need not always be constant. However, since a degradation that makes decoding of additional information difficult is problematic, the type or cause of a degradation that leads to a failure of decoding may change depending on the multiplexing method. In an image on which additional information is multiplexed by the method described with reference to FIG. 4 and the like, decoding of the additional information is difficult because of a degradation that changes the brightness level (or density level) or spatial frequency characteristic in a block. For example, the brightness level that locally rises due to the reflection image of the light or locally lowers due to dust or the like adhered to the imaging element or a low-pass filter can cause an error in decoded additional information.

Figure 14A:
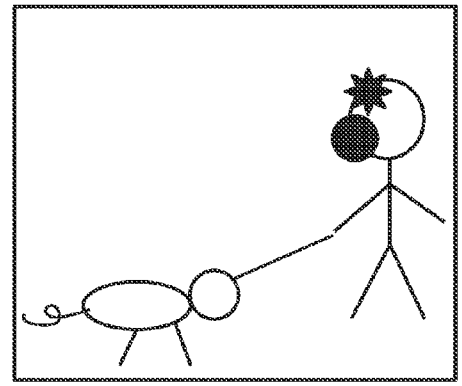
FIGS. 14A, 14B, and 14C are views showing an example of stationary noise by shooting of a camera.
Figure 14B:
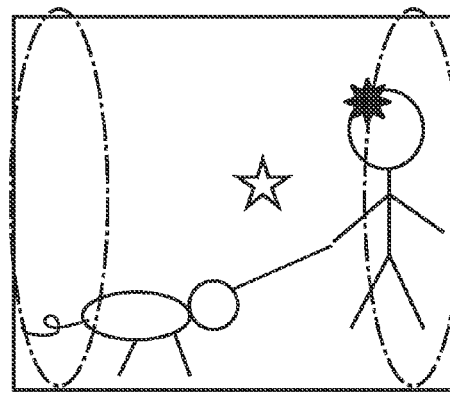
Figure 14C:
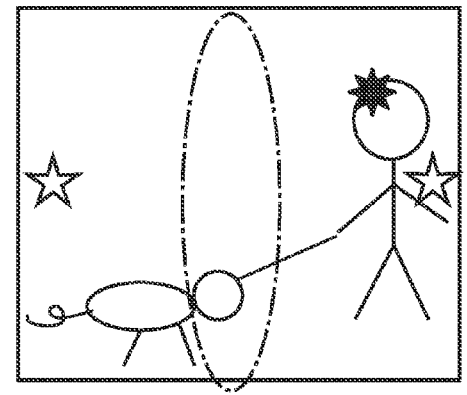

FIG. 14A shows an image obtained by shooting a printed product under a camera light. The black circle indicates the reflection image of the camera light. The reflection image continuously exists as long as the camera light is on. FIGS. 14B and 14C are views for explaining the influence of the aberration of the camera lens in printed product shooting by the camera. FIG. 14B shows an image shot while placing the focus (star) of the camera at the center. A blur (a portion surrounded by an alternate long and short dashed line) occurs on the periphery due to the influence of the aberration of the camera. FIG. 14C shows an image shot while placing the focus (star) of the camera on the periphery. Although a blur on the periphery is improved to some extent, the image at the center degrades due to the blur (a portion surrounded by an alternate long and short dashed line).

An additional information demultiplexing method will be described next in detail with reference to FIG. 15. FIG. 15 shows the functional blocks of the camera-equipped portable terminal 104 according to this embodiment. Note that although FIG. 15 will be explained as functional blocks, FIG. 15 can also be said to be a flowchart showing the procedure of processing by the functions. In this embodiment, the functions are implemented by executing a decoding application (that is, a program) by the control unit 120 but may be implemented by dedicated hardware.

First, the user activates the decoding application of the camera-equipped portable terminal 104. The decoding application includes a shooting condition setting function S1501 of setting a shooting condition, a shooting function S1502 of shooting a printed product based on the shooting condition setting function S1501, and a decoding function S1503 of decoding additional information multiplexed on the image obtained by the shooting function S1502. The decoding application also includes a multiplexed data evaluation function S1504 of evaluating multiplexed data (that is, additional information multiplexed on an image) of each image obtained by the decoding function S1503, and a multiplexed data merging function S1505 of merging (or combining) the multiplexed data of each image evaluated by the multiplexed data evaluation function S1504 so as to finally acquire correct additional information.

Figure 16:
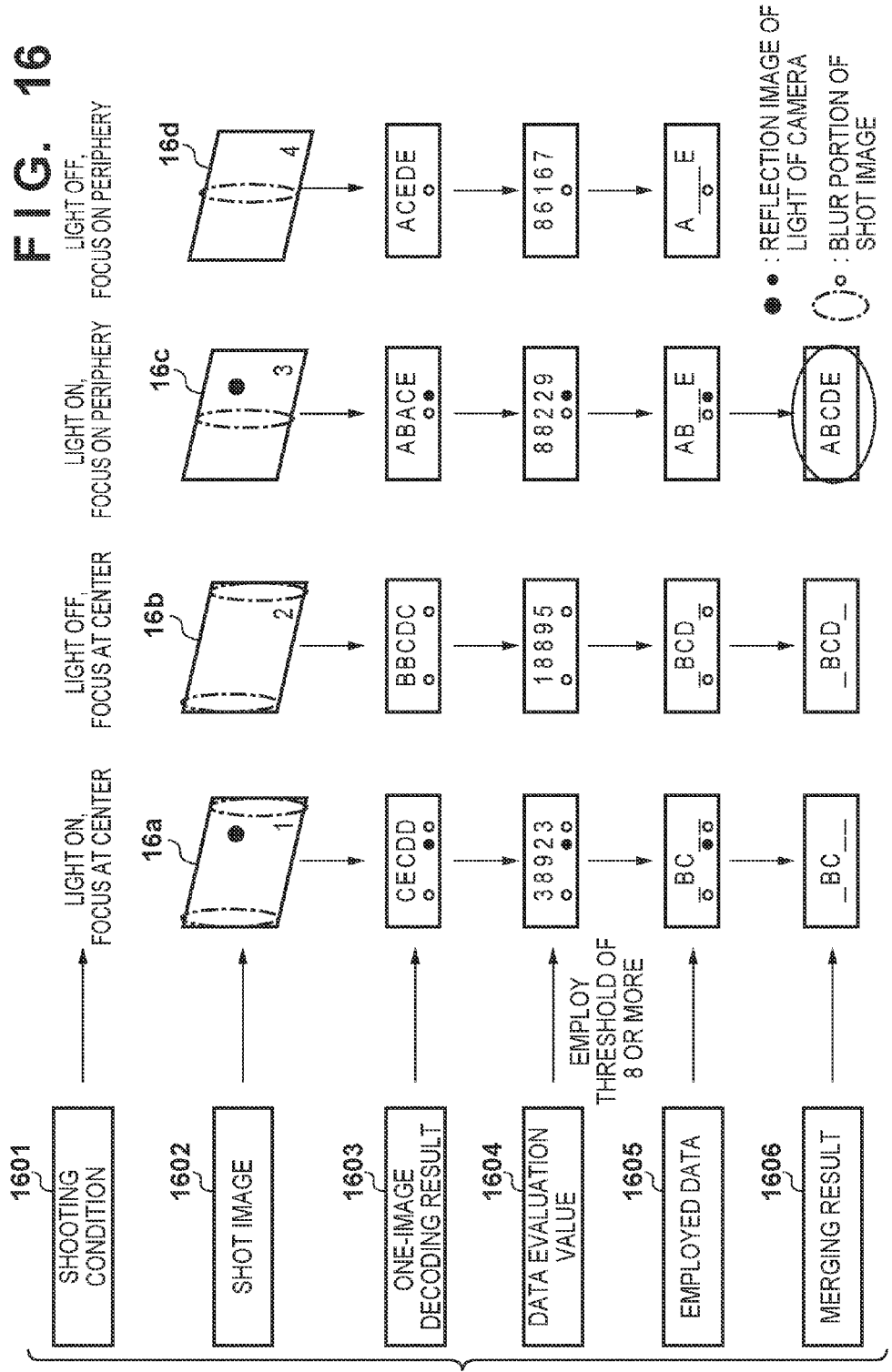
FIG. 16 is a view showing a detailed example of suppressing stationary noise by setting a shooting condition.

FIG. 16 is a view for explaining an example of the additional information demultiplexing method shown in FIG. 15. The functions shown in FIG. 15 will be described below in detail with reference to FIG. 16.

The shooting condition setting function S1501 can set a plurality of shooting conditions. Examples of the shooting conditions are light ON of the camera-equipped portable terminal considering a shortage in the ambient light amount, and light OFF to suppress the influence of the reflection image of the light. Also there exist shooting conditions such as setting of a plurality of shutter speeds considering the moving speed of the camera-equipped portable terminal in shooting, and designation of a shooting resolution considering the processing speed or memory capacity. Shooting conditions other than these shooting conditions may be set.

Current shooting conditions may dynamically be set based on shooting conditions set in the past. For example, shooting is performed first by setting the shooting condition setting of the camera to an auto mode. Next shooting conditions may be determined based on the shooting conditions in the auto mode. If the shooting conditions of the camera of the camera-equipped portable terminal 104 are automatically set based on the ambient environment, the shooting information of the camera-equipped portable terminal may indirectly be changed by changing the ambient environment. For example, shooting information to increase the shutter speed may automatically be set by increasing the light amount.

The shooting condition setting function S1501 sets four different shooting conditions as shooting conditions 1601 in FIG. 16 by light ON/OFF and focal point. For example, the two focus positions shown in FIGS. 14B and 14C and light ON/OFF shown in FIG. 14A are combined to obtain four different shooting conditions. That is, since the user performs shooting under each shooting condition, the shooting is performed four times.

The shooting function S1502 performs shooting based on the setting of the shooting condition setting function S1501. A setting change based on the shooting condition is preferably done by the camera-equipped portable terminal 104 in each shooting. A setting change based on the shooting condition is executed under the control of the control unit 120. The shooting may be performed as continuous shooting after a plurality of shooting conditions are set.

Alternatively, the shooting condition may be set for every shooting, and shooting may repetitively be performed. Note that this shooting may be performed in a still image continuous shooting mode. Alternatively, the shooting may be performed in a moving image mode, and after that, each frame may be extracted and divided as image data. If the shooting is performed not by the camera function of the camera-equipped portable terminal 104 but by a digital still camera, a plurality of continuously shot images may be loaded to a personal computer or the like, and the plurality of loaded images may be processed by activating a decoding application on the OS of the personal computer. In FIGS. 16, 16a to 16d of a shot image 1602 indicate results obtained by shooting the same object under the four different shooting conditions 1601 set by the shooting condition setting function S1501 in advance. The shot image 1602 shows the reflection image of the light and a blur portion generated by a lens aberration, as in FIGS. 14A, 14B, and 14C.

The decoding function S1503 decodes multiplexed information embedded in each image obtained by the shooting function S1502 and acquires multiplexed data. The decoding processing has been described above in detail with reference to FIG. 7, and a description thereof will be omitted here. A one-image decoding result 1603 shown in FIG. 16 indicates multiplexed data obtained by performing decoding for the shot images 16a to 16d in FIG. 16 by the decoding function S1503. The correspondence between the reflection image, the blur portion, and the multiplexed data will be described here. For example, a target image is divided into five regions in the horizontal direction. Each region is further divided into a plurality of blocks, and additional information is multiplexed on each region. As an example of multiplexed data obtained from the regions of the shot image 16aa in FIG. 16, multiplexed data C is obtained from the leftmost region, and multiplexed data E is obtained from the second region from the left.

In each of the shot images 16a and 16c in FIG. 16, the reflection image portion of the light is included in the second region from the right. The second data from the right out of the multiplexed data in the decoding result 1603 of the shot image 16a in FIG. 16 is information decoded from the region corresponding to the reflection image portion, and multiplexed data D is obtained. On the other hand, the second data from the right out of the multiplexed data in the decoding result 1603 of the shot image 16*c* in FIG. 16 is information decoded from the region corresponding to the reflection image portion, and multiplexed data C is obtained. In each of the shot images 16*a* and 16*b* in FIG. 16, a blur portion is included in each of the regions at the ends. The first and fifth data from the right out of the multiplexed data in the decoding result 1603 shown in FIG. 16 are information decoded from the regions corresponding to the blur portions on the periphery. In each of the shot images 16*c* and 16*d* in FIG. 16, a blur portion is included in the region at the center. The third data from the right out of the multiplexed data in the decoding result 1603 shown in FIG. 16 is information decoded from the region corresponding to the blur portion at the center.

The multiplexed data evaluation function S1504 calculates an evaluation value corresponding to the data (that is, the additional information) obtained by the decoding function S1503. The evaluation is done for each region as a unit of decoding. There are two evaluation value calculation methods, that is, a method of calculating an evaluation value using only image information and a method of calculating an evaluation value using information other than the image information as well. An evaluation value calculation method using image information will be described first. As the simplest example, the determination value used by the determination unit 710 in FIG. 7 may directly be used as an evaluation value, or a new evaluation value may be calculated from the determination value. An evaluation value may completely newly be calculated based on the image information. The evaluation value is not limited to these as long as it is obtained from the image information.

As an example of a new evaluation value, several methods including an evaluation value calculation method using error detection will be described. In the method using error detection, an error detection code is added to additional information at the input 101 of additional information in FIG. 1, thereby imparting an error detection function. As the error detection code, a plurality of methods such as CRC have been proposed, and a detailed description thereof will be omitted. The error detection code in not limited to this as long as it detects a data error. In this example, additional information is multiplexed for each block, as shown in FIG. 5. For this reason, the error detection code is also multiplexed on a block allocated to the error detection code. For example, each region as a unit of decoding shown in FIG. 16 includes a plurality of blocks, and some of the blocks are allocated to an error detection code to be added. The error detection code can be CRC described above. However, a simple check sum such as a parity bit may be used to shorten the code length.

In the method of performing evaluation using the determination result of the determination unit 710, the region as the evaluation target can be a block at the time of decoding processing. For example, in the example shown in FIG. 7, two variances obtained for each block are evaluated. When the threshold pattern indicates one of them more conspicuously, a higher evaluation value is given. For this reason, the absolute value of the difference between the two variances is considered to be used as an evaluation value. In this case, as the difference becomes small, discrimination of the code multiplexed on the block is difficult, and the likelihood of the data obtained by decoding can be evaluated as low.

An evaluation value may be obtained by evaluating additional information using information different from image information. Examples of information other than image information are a shooting condition, a camera model, and information obtained from the sensor of the camera. For example, when the light of the camera is ON, the evaluation value of the reflection image portion of the light can be the lowest value. If the focus of the camera is placed on the periphery, the evaluation value of the periphery can be made large. The light ON condition or the focal length can be acquired from the camera. However, to know the reflection image of the light or a defocus portion (a portion out of focus) in an image, it may be necessary to perform image analysis by, for example, recognizing the image of the light in the evaluation target image and evaluating a blur of the image. Cameras can be classified into models capable of acquiring a non-compressed shot image and models capable of acquiring a compressed shot image. If compression is performed mainly for saturation, the multiplexed signal of the saturation may be lost. Hence, a camera that compresses a shot image preferably changes the degree of importance of the saturation to change the evaluation value in the evaluation value calculation process. For example, in a model that compresses a shot image, if additional information is multiplexed on the saturation, a separately obtained evaluation value is multiplied by a predetermined coefficient (for example, a positive coefficient of 1 or less). Note that to multiplex additional information on the saturation, for example, a shot color image in RGB is converted into a luminance-color difference colorimetric system (for example, L*a*b*), and the color difference components are quantized in accordance with the procedure described with reference to FIG. 4, thereby multiplexing additional information.

After data is acquired by the decoding function S1503, the data evaluation function S1504 executes evaluation (including, for example, error detection) for these data. When an error detection code is used, as in the above-described example, the evaluation value can be set to the highest value in a case in which no error is detected, and to the lowest value in a case in which an error is detected. Even in a case in which information other than image information is used, the evaluation value can be obtained in accordance with the above-described procedure. Data evaluation values 1604 in FIG. 16 are examples of evaluation values corresponding to the multiplexed data of the decoding results 1603 in FIG. 16. This example shows that a larger numerical value represents a higher evaluation. As a characteristic feature, the evaluation value of the data evaluations 1604 in FIG. 16 become low in a reflection image and blur portions. For example, when each block included in the leftmost region of the shot image 16*a* in FIG. 16 is determined using the arrangement in FIG. 7, an evaluation value "3" is calculated. Similarly, when each block included in the second region from the left in the shot image 16*a* of FIG. 16 is determined using the arrangement in FIG. 7, an evaluation value "8" is calculated.

The multiplexed data merging function S1505 employs multiplexed data based on the evaluation values obtained by the multiplexed data evaluation function S1504, and merges the data. Data 1605 in FIG. 16 shows that based on the evaluation values of the data evaluation 1604 in FIG. 16, a threshold is set to 8, and data multiplexed on a region equal to or more than the threshold is employed. A merging result 1606 in FIG. 16 shows a result of merging the employed data 1605 in FIG. 16. Correct data can finally be acquired. In the employed data 1605 of FIG. 16, if there are a plurality of data decoded from the same region, and the data are different from each other, for example, data of a high evaluation value may preferentially be employed and merged based on the evaluation value.

With the above-described arrangement and procedure, when decoding (or demultiplexing) additional information multiplexed on an image from the image including stationary noise such as the reflection image of the light or a blur of the image, an error of the decoded additional information can be suppressed. For example, assume that a shot image 16*a* is obtained by shooting a printed material of any image in which multiplexed data "ABCDE" is embedded. When the multiplexed data is acquired from only the shot image 16*a*, multiplexed data "CBCCD" may be obtained due to the influence of a blur portion and the like, and it may be impossible to obtain the embedded multiplexed data "ABCDE". In this embodiment, however, multiplexed data of high evaluation value are merged from a plurality of shot images obtained under a plurality of shooting conditions. This makes it possible to eventually obtain the multiplexed data "ABCDE" and suppress an error of the decoded additional information.

Note that in this embodiment, defocusing and the reflection image of the light turned on by the camera have been exemplified as noise. Even for other stationary noise, when pieces of additional information are decoded from identical images shot under different shooting conditions, evaluated, and merged, errors can be reduced. The shooting conditions include, for example, a setting concerning generation of stationary noise, and are preferably settings controllable by the camera.

(Second Embodiment)

In the shooting condition setting of the first embodiment, there are an infinite number of assumable combinations of shooting conditions. It is not realistic to perform shooting under all the shooting conditions, attempt decoding, and evaluate decoded information. In the second embodiment, an arrangement capable of correctly separating additional information even in such a case will be described.

Figure 17:
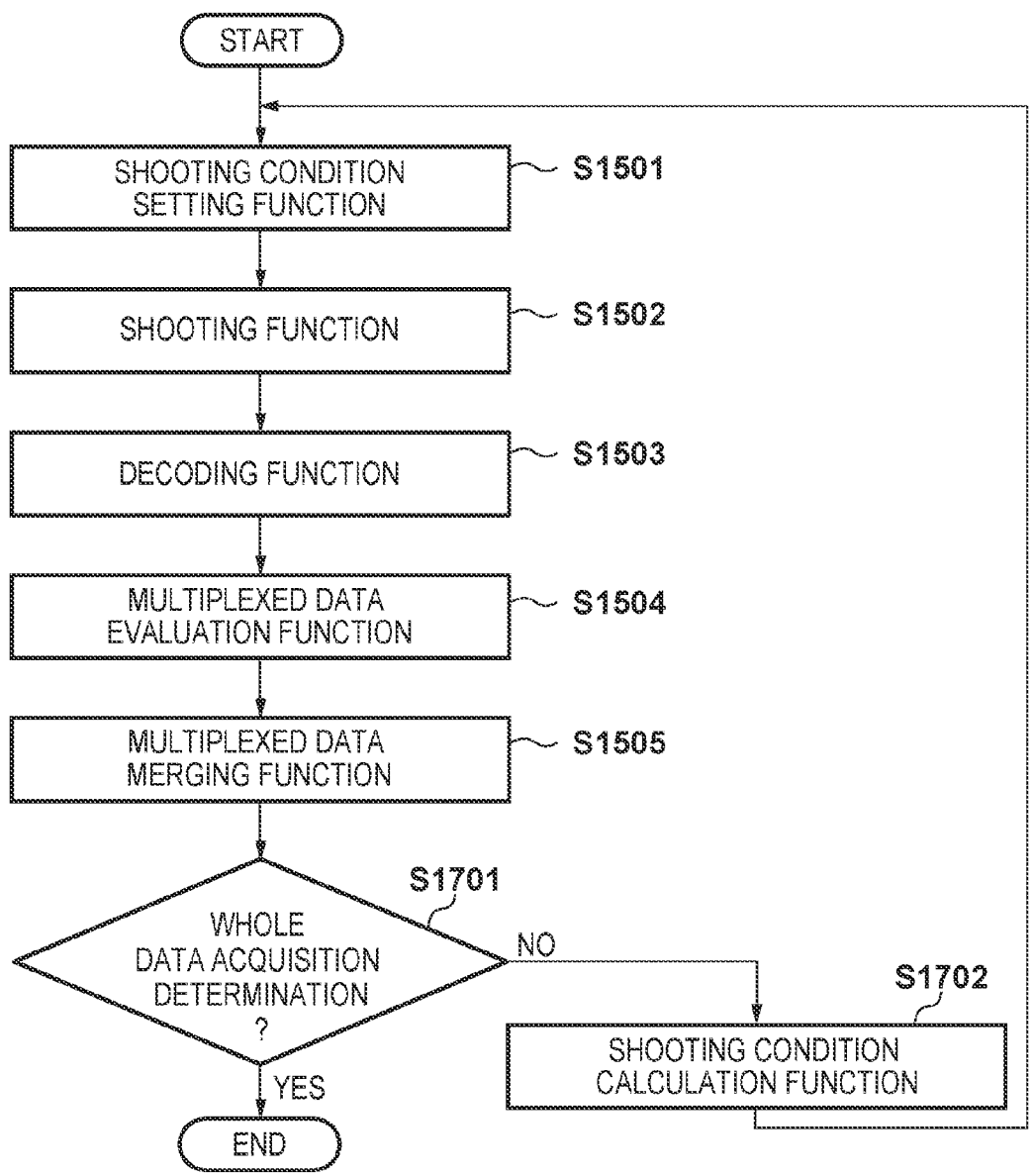
FIG. 17 is a flowchart showing suppressing stationary noise.

In the flowchart of FIG. 17, steps S1701 and S1702 are added to FIG. 15 of the first embodiment. The same reference numbers as in FIG. 15 denote the same blocks in FIG. 17, and a description thereof will be omitted. Details of the newly added steps S1701 and S1702 will be described here. Note that although FIG. 15 has been described as a block diagram, it may be a flowchart of a procedure executed by the control unit 120. FIG. 15 is applied to FIG. 17 from the viewpoint. This also applies to FIG. 19 to be described later.

FIGS. 18A and 18B are views for explaining an example of the additional information demultiplexing method shown in FIG. 17. In the whole data acquisition determination S1701, it is determined whether all data after merging are acquired. Upon determining in step S1701 that all data are acquired (YES in step S1701), the processing ends. On the other hand, upon determining in step S1701 that all data are not acquired (NO in step S1701), the process advances to the shooting condition calculation function S1702.

The shooting condition calculation function S1702 can specify a portion that cannot correctly be decoded from data obtained by a multiplexed data merging function S1505, and set a shooting condition suitable for the portion. For example, if undecodable portions concentrate, a shooting condition suitable for the portion can be set. If undecodable portions disperse, a plurality of shooting conditions can be set in the portions.

This will be described below in detail with reference to FIGS. 18A and 18B. In FIG. 18A, 1801 and 1802 are images obtained by shooting a multiplexed printed product with a black central portion. More specifically, when the image 1801 in FIG. 18A is shot under a certain shooting condition, the decoding result of the image 1801 obtained by a decoding function S1503 is evaluated by a multiplexed data evaluation function S1504. Based on the evaluation result, a portion whose evaluation value is lower than a predetermined value, that is, a portion that cannot correctly be decoded is not employed in the merging processing of the multiplexed data merging function S1505. Upon determining in step S1701 that the data of all regions are not acquired, in step S1702, a region whose data is not acquired is specified, and a shooting condition suitable for the portion is set. For example, information decoded from the image 1801 is evaluated, and it is determined that the evaluation value of the white portion does not reach the threshold. If whether the distance of the out-of-focus portion (white portion) is short or long is unknown, in step S1702, shooting conditions for both a setting of shortening the focal length and a setting of prolonging the focal length are decided based on the shooting condition of the image 1801. Other than the focus, a shooting condition such as a white balance or shutter speed suitable for the out-of-focus portion (white portion) may be set. A shooting condition setting function S1501 sets the shooting condition (or if the shooting condition is set by the shooting condition calculation function S1702, processing need not be executed as all). A shooting function S1502 shoots the image 1802 under the shooting condition. If the evaluation value of information obtained by decoding the white portion of the image 1802 reaches the threshold, it is determined that all data are obtained by merging of the multiplexed data merging function S1505. In the image 1802 shot under a changed shooting condition, the portion that cannot correctly be decoded in the image 1801 can correctly be decoded. In the image 1801, the shooting condition is set for the central portion. Since the shooting condition is suitable for the black portion, the multiplexed signal of the white portion may degrade at high possibility. Hence, correct data of the white portion cannot be acquired even if the shooting is done under the same shooting condition. The image 1802 is an image obtained by setting a shooting condition suitable for the degraded place of the white portion in the image 1801 and performing shooting. Since the shooting condition is suitable for the white portion, the data of the degraded place of the white portion of the image 1801 can correctly be decoded. In contrast, the multiplexed signal of the black portion degrades. Finally, when the result of the image 1801 and the result of the image 1802 are merged, correct multiplexed data can be obtained.

In FIG. 18B, 1803 and 1804 show an example in which if a printed material in which the same additional information is multiplexed on different regions a plurality of times cannot correctly be decoded because of an aging degradation, the additional information is correctly decoded. More specifically, if a portion that cannot correctly be decoded exists in the decoding result of the image 1803, shooting is performed under a shooting condition suitable for a candidate portion, thereby obtaining the image 1804. In the image 1804, the portion that cannot correctly be decoded in the image 1803 can correctly be decoded. In the image 1803, a candidate portion in which the same data as that of the aging degradation portion is embedded exists on the periphery. In the image 1803, however, since the focus that is the shooting condition is placed at the center, no focus is attained on the periphery, and correct data cannot be decoded on the periphery. Hence, correct data cannot be acquired even if shooting is performed under the same shooting condition. In the image 1804, the shooting condition is set for the candidate portion in which the same data as that of the aging degradation portion is embedded. Hence, the data of the candidate portion can correctly be decoded. That is, the result of the image 1803 and the result of the image 1804 are merged, correct multiplexed data can be obtained. However, as the precondition, that the same information is multiplexed on a plurality of regions needs to be known in advance when performing decoding. That the same information is multiplexed on a plurality of regions may be known from part of composite data. This example is also applicable to an image including the reflection image of the light source in a specific portion.

Even in a case in which additional information is redundantly multiplexed, as described above, information obtained from a portion where decoding is appropriately performed is employed as decoded information. This makes it possible to extract additional information multiplexed on an image from the image including stationary noise such as defocusing or an aging degradation of the original image while suppressing an error. Any method other than these methods is also usable if it sets a shooting condition based on data after merging.

(Third Embodiment)

In this embodiment, prompting the user to move a camera or a printed product and suppressing the influence of stationary noise by the movement of the camera or the printed product in the first or second embodiment will be described.

An example of suppression of the influence of stationary noise will be described with reference to FIG. 20. As for shot images 2001 and 2002 in FIG. 20, after the shot image 2001 is obtained, the shot image 2002 is obtained by moving the camera to the right. When the camera is moved to the right with respect to the printed product as a reference, the reflection image of the light also moves to the right of the printed product. When the position of the reflection image of the light moves, a place where correct additional information cannot be acquired due to the reflection image in the shot image 2001 changes to a place where correct additional information can be acquired in the shot image 2002. When the results of the shot images 2001 and 2002 are merged, correct additional information can finally be acquired.

Figure 19:
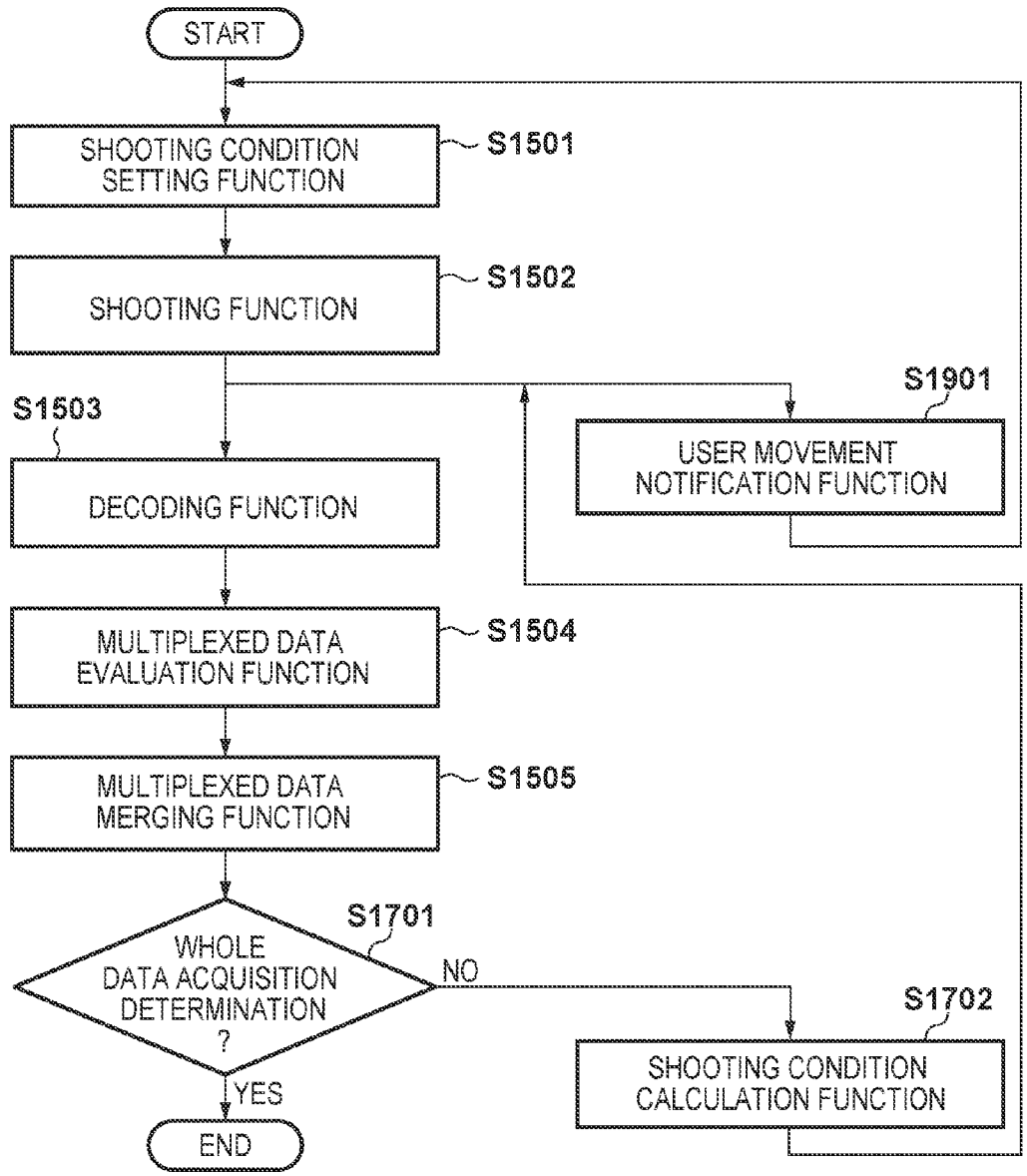
FIG. 19 is a flowchart showing suppressing stationary noise.

In the flowchart of FIG. 19, step S1901 is added to the flowchart of FIG. 17 of the second embodiment. The same step numbers as in the flowchart of FIG. 17 denote the same steps in FIG. 19, and a description thereof will be omitted. Details of newly added step S1901 will be described.

The user movement notification function S1901 notifies that the user moves after a shooting function S1502 or if NO in whole data acquisition determination S1701. A notification method is not limited to a voice, screen display, or a vibration as long as it can notify the user. This notification includes at least a message to prompt the user to move the camera.

A direction to move may be displayed on the screen based on a portion that cannot correctly be decoded, which is obtained by a shooting condition calculation function S1702. The notification may include information representing a moving amount. In this case, the user movement notification function S1901 specifies stationary noise (for example, the reflection image of the light) included in the image and the position thereof, and decides a camera moving direction that enables shooting the region without including the noise. The moving amount may further be decided. The decided moving direction (and the moving amount) is displayed.

When the camera is moved, a data merging function S1505 needs to determine portions that match between the images and decide the correspondence of regions between the images. This is done by, for example, obtaining the correlation between the images. The image that is shot first is preferably an image that serves as a reference image including, for example, a whole image printed on a paper medium or the like. In this case, the correspondence to the image shot by the moved camera is decided based on the reference image, and the decoded codes are merged in accordance with the correspondence. Alternatively, the correspondence may be decided based on the codes of the decoding results of the images before and after the movement, and the codes may be merged.

In the above-described embodiment as well, it is possible to reduce the influence of stationary noise generated in an image and implement satisfactory additional information decoding. Note that this embodiment can also be executed in combination of the first embodiment.

Note that all the above embodiments have been described using a camera-equipped portable terminal. However, even an information processing apparatus that does not have a camera function of shooting an image can implement the inventions of the embodiments by performing decoding of the embodiments for a shot image. In this case, it is necessary to set the shooting condition of the camera and change the setting of the camera from the terminal. Additionally, in this case, the shooting condition can be not only implemented by the function of the camera but also given or changed by a device other than the camera connected to the terminal apparatus.

[Fourth Embodiment]

Visually indistinguishably embedding additional information in image information has an advantage that the additional information does not visually impede a printed product such as a photograph or a picture. On the other hand, there is a disadvantage that embedding of the additional information cannot visually be discriminated. To discriminate embedding of the additional information, the additional information demultiplexing unit may actually analyze the additional information. However, analyzing all pieces of additional information may be time-consuming. Japanese Patent Laid-Open No. 2006-50043 discloses notifying the user of the possibility of analysis using a screen output or voice output when some pieces of additional information can be analyzed.

However, the technique disclosed in Japanese Patent Laid-Open No. 2006-50043 has the following problem. That is, there exists a case in which even if some pieces of additional information are analyzed, the remaining pieces of additional information cannot be analyzed.

For example, when analyzing additional information using the shooting function of an imaging device included in a smartphone, the shooting is not always performed by arranging the imaging device and an object such as a photograph or a picture in parallel. Even if the shooting is done by placing a photograph on a plane, the smartphone may tilt without stabilizing because the user performs shooting by the smartphone held in a hand. The smartphone displays a shot moving image on the screen upon shooting. Hence, to view the screen, the user tends to tilt the smartphone to the user side. If the imaging device tilts with respect to the object, the shooting distance between the object and the imaging device changes in accordance with the position of the object. When the shooting distance changes, the focal length also changes. Since the image blurs in accordance with the position of the shot object, the additional information cannot be analyzed.

This embodiment has been made in consideration of this problem, and provides a technique for appropriately notifying a user of a message concerning extraction when extracting additional information from a captured image of a printed product with the printed additional information.

According to the invention of the embodiment, it is possible to appropriately notify a user of a message concerning extraction when extracting additional information from a captured image of a printed product with the printed additional information.

An example of an information processing apparatus as follows will be described below. That is, the information processing apparatus acquires a captured image of a printed product, and notifies a message concerning extraction of additional information printed at a plurality of points based on whether out of codes printed at the plurality of points on the printed product, a code is extracted from a predetermined point of the captured image.

First, an additional information multiplexing unit that embeds (multiplexes) additional information in image information as a print image (including an image or a character as a print target) will be explained. Note that the additional information multiplexing unit may be installed in a computer as printer driver software or application software in the computer that generates a print image (image information) to be output to a printer engine mounted in a printer, a multi function peripheral, or the like. The additional information multiplexing unit may be incorporated as hardware and/or software in a copying machine, a facsimile apparatus, a printer body, or the like.

Figure 21A:
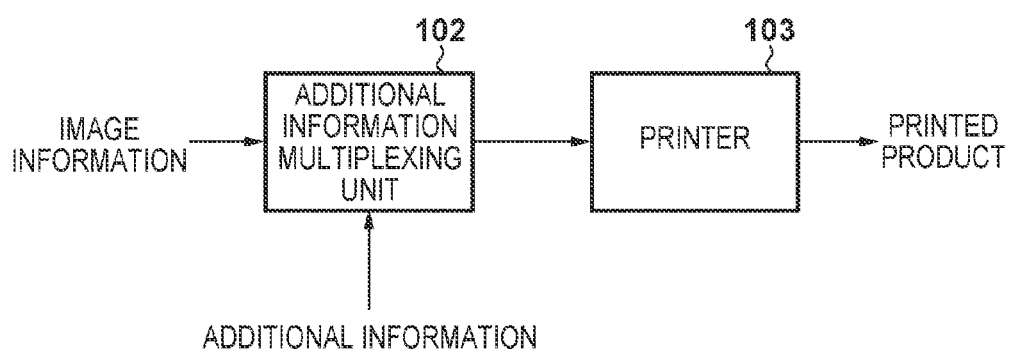
FIGS. 21A and 21B are block diagrams showing an example of the arrangement of a system and a camera-equipped portable terminal.
Figure 21B:
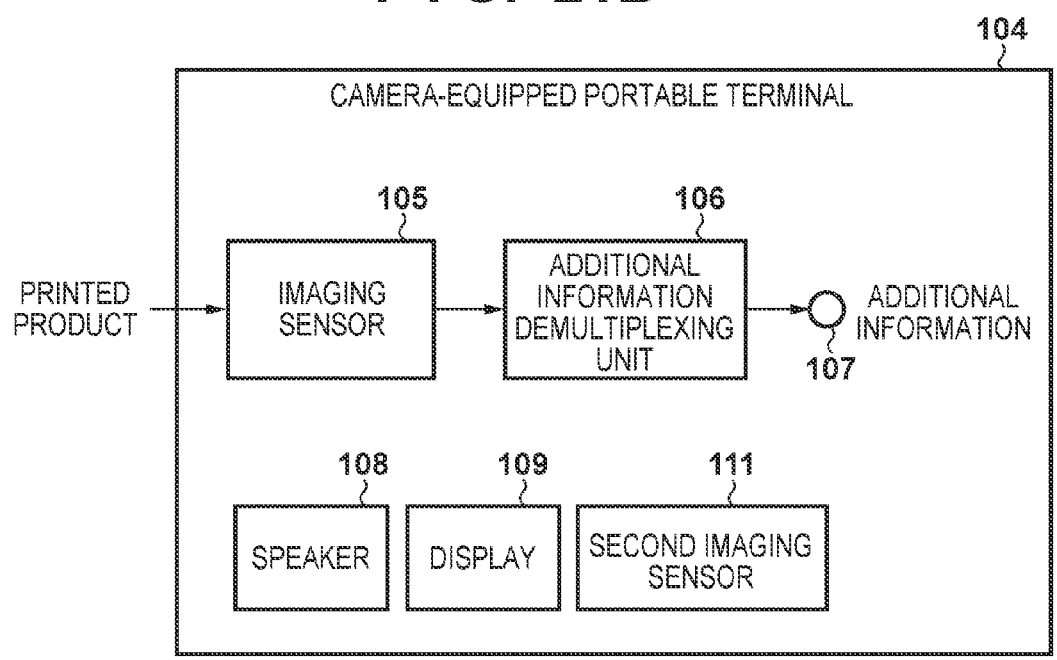

FIGS. 21A and 21B are block diagrams showing an example of the arrangement of a system including the additional information multiplexing unit, which embeds additional information in a printed product and outputs.

A monochrome or multi-tone print image (image information) and additional information that is information to be embedded in the print image are input to an additional information multiplexing unit 102. The additional information is information different from the image information. Examples are voice information, moving image information, text information, image attribute information such as a copyright, shooting date/time, shooting location, and user associated with image information, and another image information different from the image information.

The additional information multiplexing unit 102 embeds additional information at a plurality of points on a print image. The additional information is embedded such that the embedded additional information is difficult to visually recognize. The additional information multiplexing unit 102 sends the print image with the embedded additional information to a printer 103.

The printer 103 is a printer that implements a halftoning expression using pseudo-halftoning, for example, an inkjet printer or a laser printer. The printer 103 is a printing apparatus that prints the print image from the additional information multiplexing unit 102 on a print medium such as paper, thereby generating a printed product. Needless to say, any other apparatus having a print function such as a multi function peripheral may be used as long as it is an apparatus that prints the print image from the additional information multiplexing unit 102 on a print medium such as paper.

An example of the arrangement of the additional information multiplexing unit 102 is the same as that described with reference to the block diagrams of FIGS. 2 and 3.

A series of processes of setting a quantization condition for each block of the print image and performing error diffusion based on the quantization condition for each block by the additional information multiplexing unit 102 is the same as that described with reference to the flowchart of FIG. 4. In this embodiment, however, the flowchart of FIG. 4 will be explained anew by referring to a multiplexing region shown in FIG. 22.

<Step S401>

A CPU 211 initializes the value of a variable i representing the vertical pixel position (x-coordinate value) of the print image to 0.

<Step S402>

The CPU 211 initializes the value of a variable j representing the horizontal pixel position (y-coordinate value) of the print image to 0. In the following explanation, the position of the upper left corner of the print image is set to the origin (0, 0). The x-coordinate value increases rightward in the image, and the y-coordinate value increases downward in the image. However, in the following processing, if all pixel positions on the print image can be scanned, the initial values of the variables i and j and the scanning direction are not limited to those to be described here.

<Step S403>

A quantization condition control unit 202 determines whether the pixel at the pixel position (i, j) on the print image belongs to a region (multiplexing region) to multiplex a code. The multiplexing region will be described with reference to FIG. 22.

Figure 22:
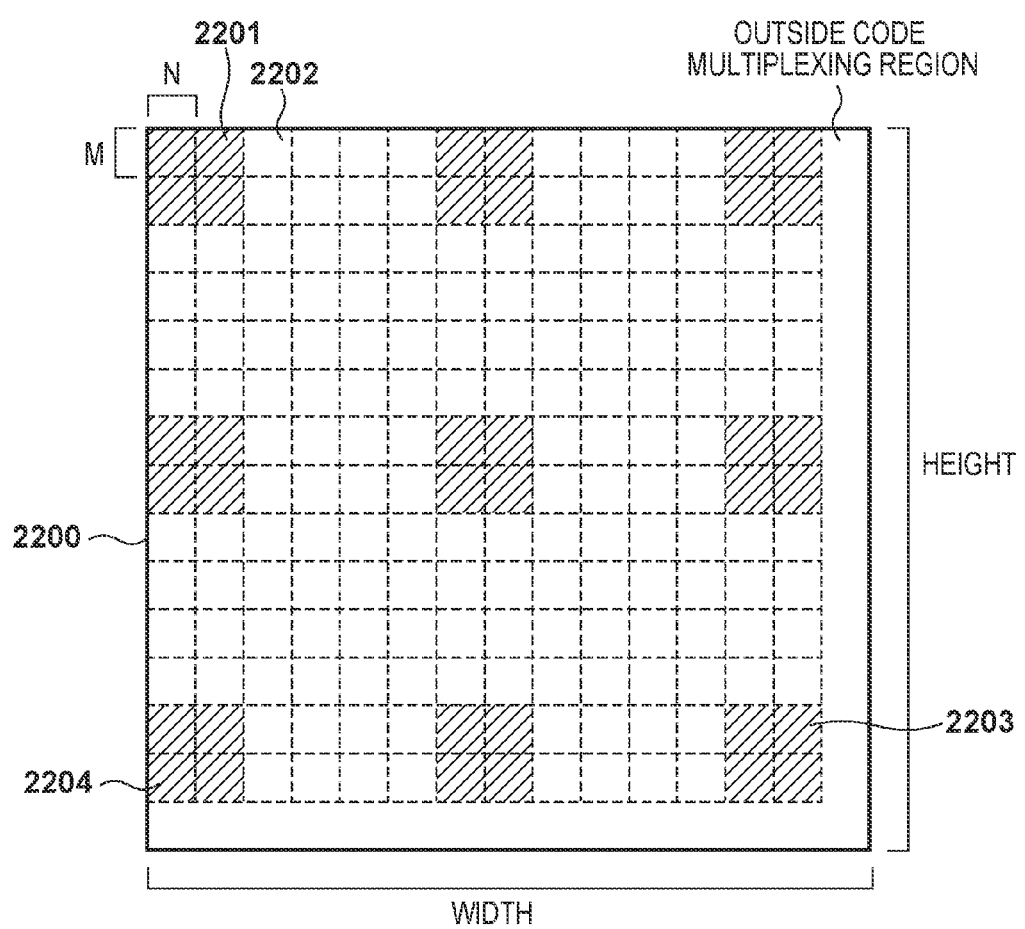
FIG. 22 is a view for explaining a multiplexing region.

Reference numeral 2200 in FIG. 22 denotes an entire print image that has a vertical size=HEIGHT and a horizontal size=WIDTH. Rectangles segmented by dotted lines in the print image 2200 represent blocks divided by a block formation unit 201, each of which has a vertical size=M pixels and a horizontal size=N pixels. Note that M is a natural number that meets 2≤M<HEIGHT and N is a natural number that meets 2≤N<WIDTH. Note that in FIG. 22, blocks are formed using the origin of the print image 2200 as the reference point. However, blocks may be formed using a point different from the origin as the reference point.

As shown in FIG. 22, when blocks are formed using the origin of the print image 2200 as the reference point, the number W of horizontal blocks=INT(WIDTH/N), and the number H of vertical blocks=INT(HEIGHT/M), where INT (X) is a function that returns the integer portion of X. As shown in FIG. 22, in a state in which W blocks are arranged in the horizontal direction, and H blocks are arranged in the vertical direction from the origin of the print image 2200, regions (non-block regions) without blocks are formed at the right and lower ends of the print image 2200. In this embodiment, the region of each block is defined as a multiplexing region, and each non-block region is defined as a non-multiplexing region.

That is, in step S403, it is determined whether the pixel position (i, j) on the print image is a pixel position in one of the blocks (a pixel position in a multiplexing region). Upon determining that the pixel position (i, j) on the print image is a pixel position in a multiplexing region, the process advances to step S405. If the pixel position (i, j) is a pixel position in a non-multiplexing region, the process advances to step S404.

<Step S404>

The quantization condition control unit 202 sets a quantization condition C as a quantization condition. Details of the quantization condition C are the same as described with reference to FIG. 6.

<Step S405>

The quantization condition control unit 202 acquires a code assigned to the block to which the pixel position (i, j) o the print image belongs. In this embodiment, an array including elements as many as the blocks, in which a bit value for a corresponding block is registered in each element, is created. A bit value registered in the element corresponding to the block to which the pixel position (i, j) on the print image belongs in the array is acquired. In FIG. 22, since the number of blocks is 14 vertical blocks×14 horizontal blocks=196 blocks, a one-dimensional array CODE[ ] including 196 elements is created. A bit value corresponding to the 0th block, a bit value corresponding to the first block, . . . , a bit value corresponding to the 195th block are registered in CODE[0], CODE[1], . . . , CODE [195], respectively. Note that the array may be a two-dimensional array including 14×14 elements.

The blocks on the print image include a block on which position information representing the position of the block is multiplexed and a block on which additional information is multiplexed. In FIG. 22, a hatched block 2201 is a block (position information multiplexing block) on which position information is multiplexed, and a non-hatched block 2202 is a block (additional information multiplexing block) on which additional information is multiplexed. In FIG. 22, 2×2 position information multiplexing blocks form one set. A 4-bit value including bit values corresponding to the 2×2 position information multiplexing blocks represents the position information of one set formed from the 2×2 position information multiplexing blocks. Nine sets are provided in the print image 2200.

The set at the left on the upper row is the first set, the set at the center on the upper row is the second set, the set at the right on the upper row is the third set, the set at the left on the middle row is the fourth set, the set at the center on the middle row is the fifth set, the set at the right on the middle row is the sixth set, the set at the left on the lower row is the seventh set, the set at the center on the lower row is the eighth set, and the set at the right on the lower row is the ninth set.

At this time, the position information of the set at the left on the upper row is represented by "0000". In this case, the bit values corresponding to the blocks of the set are "0". The position information of the set at the center on the upper row is represented by "0001". In this case, the bit values corresponding to the upper left block, the upper right block, and the lower left block of the set are "0", and the bit value corresponding to the lower right block is "1". The position information of the set at the right on the upper row is represented by "0010". In this case, the bit values corresponding to the upper left block, the upper right block, and the lower right block of the set are "0", and the bit value corresponding to the lower left block is "1".

The position information of the set at the left on the middle row is represented by "0011". In this case, the bit values corresponding to the upper left block and the upper right block of the set are "0", and the bit values corresponding to the lower left block and the lower right block are "1". The position information of the set at the center on the middle row is represented by "0100". In this case, the bit values corresponding to the upper left block, the lower left block, and the lower right block of the set are "0", and the bit value corresponding to the upper right block is "1". The position information of the set at the right on the middle row is represented by "0101". In this case, the bit values corresponding to the upper left block and the lower left block of the set are "0", and the bit values corresponding to the upper right block and the lower right block are "1".

The position information of the set at the left on the lower row is represented by "0110". In this case, the bit values corresponding to the upper left block and the lower right block of the set are "0", and the bit values corresponding to the lower left block and the upper right block are "1". The position information of the set at the center on the lower row is represented by "0111". In this case, the bit value corresponding to the upper left block of the set is "0", and the bit values corresponding to the upper right block, the lower left block, and the lower right block are "1". The position information of the set at the right on the lower row is represented by "1000". In this case, the bit values corresponding to the upper right block, the lower left block, and the lower right block of the set are "0", and the bit value corresponding to the upper left block is "1".

In this way, each position information multiplexing block is assigned a bit value corresponding to the position information of a set to which the position information multiplexing block belongs and the position of the position information multiplexing block in the set. Note that the bit value assigning method for the position information multiplexing block is not limited to this. For example, as the position information of the position information multiplexing block, the block position (the first block, the second block, . . . ) of the position information multiplexing block on the print image 2200 or a pixel position in any part of the position information multiplexing block may be used. The position of the position information multiplexing block on the printed product may be used as the position information of the position information multiplexing block.

The quantization condition control unit 202 generates, as the array CODE, a bit string in which corresponding bit values (for a position information multiplexing block, a bit value assigned in the above-described way, and for an additional information multiplexing block, a bit value corresponding to the additional information multiplexing block in the input additional information) are arranged in the order of block arrangement. The quantization condition control unit 202 then acquires a bit value bit registered in the element corresponding to the block to which the pixel position (i, j) on the print image belongs in the array CODE. The bit value bit registered in the element corresponding to the block to which the pixel position (i, j) on the print image belongs is acquired from the array CODE in the following way.

$$bit = code[INT(i/M) \times W + INT(j/N)]$$

<Step S406>

The quantization condition control unit 202 determines whether the bit value bit acquired in step S405 is "1" or "0". Upon determining that the bit value bit acquired in step S405 is "1", the process advances to step S408. If the bit value bit is "0", the process advances to step S407.

<Step S407>

The quantization condition control unit 202 sets a quantization condition A as a quantization condition. Details of the quantization condition A are the same as described with reference to FIG. 6.

<Step S408>

The quantization condition control unit 202 sets a quantization condition B as a quantization condition. Details of the quantization condition B are the same as described with reference to FIG. 6.

<Step S409>

An error diffusion unit 200 performs error diffusion processing (quantization processing) described with reference to FIG. 3 for the pixel at the pixel position (i, j) on the print image based on the quantization condition set for the pixel in one of steps S404, S407, and S408.

<Step S410>

The CPU 211 increments the value of the variable j by one.

<Step S411>

The CPU 211 determines whether j<WIDTH. Upon determining that j<WIDTH, the process returns to step S403. If j<WIDTH does not hold, the process advances to step S412.

<Step S412>

The CPU 211 increments the value of the variable i by one.

<Step S413>

The CPU 211 determines whether i<HEIGHT. Upon determining that i<HEIGHT, the process returns to step S402. If i<HEIGHT does not hold, the processing according to the flowchart of FIG. 4 ends.

<Additional Information Demultiplexing Unit 106>

An additional information demultiplexing unit that extracts (demultiplexes) additional information from a printed product with a print image on which the elements of the array CODE are multiplexed by the additional information multiplexing unit 102 in the above-described way will be described. As an apparatus including such an additional information demultiplexing unit, for example, a camera-equipped portable terminal such as a camera-equipped portable telephone, a camera-equipped smartphone, or a camera-equipped tablet PC can be considered. The additional information demultiplexing unit may be a device that acquires, from an external imaging device, a captured image of the printed product captured by the imaging device, and extracts additional information from the acquired captured image. A camera-equipped portable terminal including the additional information demultiplexing unit will be explained below. An example of the arrangement of the camera-equipped portable terminal will be described first with reference to the block diagram of FIG. 21B.

An imaging sensor 105 captures an object in an imaging direction corresponding to the posture of a camera-equipped portable terminal 104. When the user holds the camera-equipped portable terminal 104 by a hand, adjusts the posture of the camera-equipped portable terminal 104 so as to include a printed product in the field of view of the imaging sensor 105, and input an imaging instruction, the imaging sensor 105 captures an image including the printed product. This printed product is a printed product with a print image on which the elements of the array CODE are multiplexed by the additional information multiplexing unit 102 in the above-described way. The printed product is obtained by the printer 103.

The additional information demultiplexing unit 106 extracts additional information from the image of the printed product captured by the imaging sensor 105. In this embodiment, before this processing, it is determined in advance whether additional information demultiplexing from the captured image is possible. If possible, the user is notified of it. Additional information extracted for the captured image by the additional information demultiplexing unit 106 is sent to a speaker 108 or a display 109 via a terminal 107. If the additional information is voice information, it is sent to the speaker 108 via the terminal 107. If the additional information is image information (including character information), it is sent to the display 109 via the terminal 107. The additional information may be transmitted to an external device via the terminal 107. That is, the additional information output destination is not limited to a specific output destination.

A second imaging sensor 111 is an imaging sensor provided independently of the imaging sensor 105. The printed product may be shot using the second imaging sensor 111.

Figure 23:
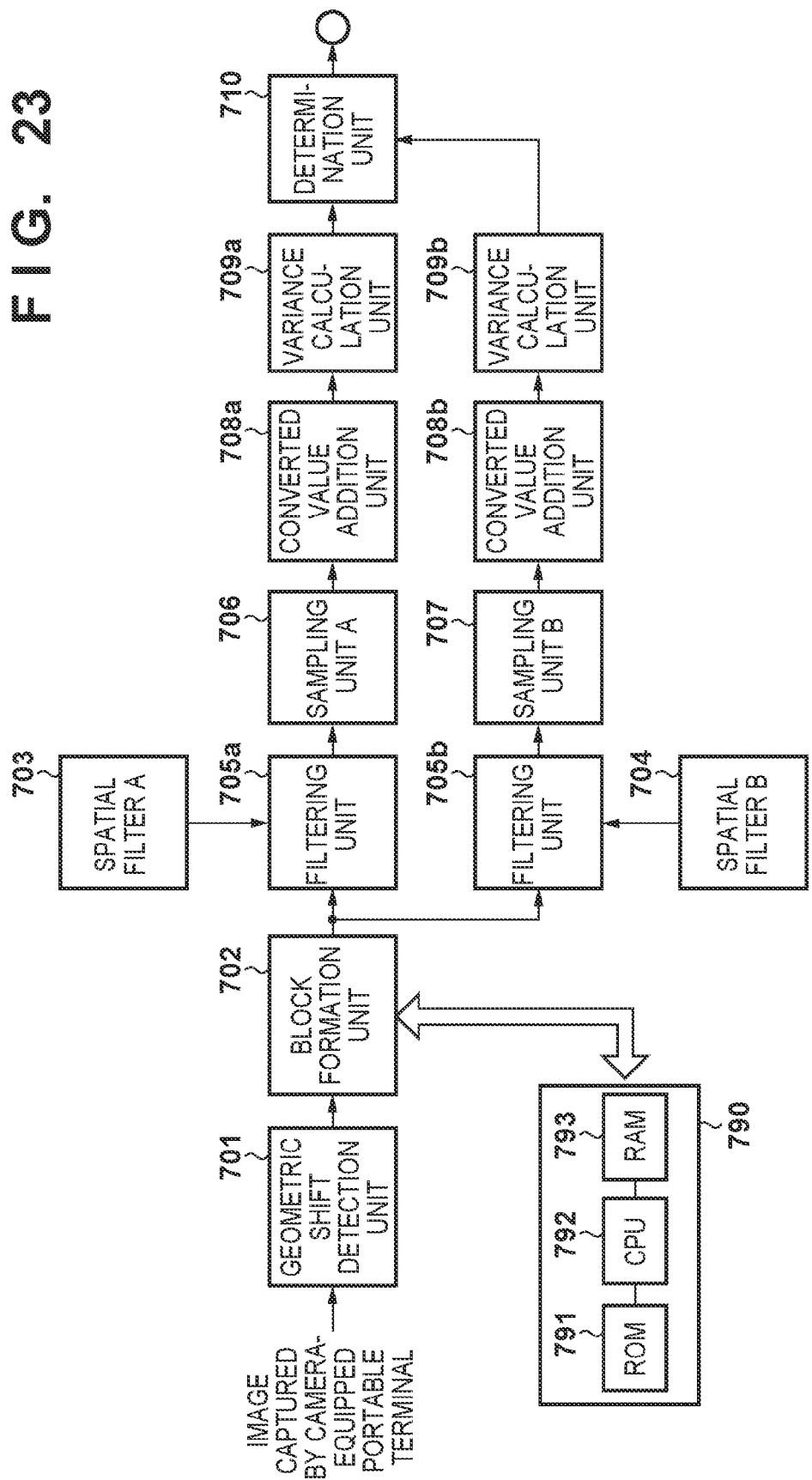
FIG. 23 is a block diagram showing an example of the arrangement of an additional information demultiplexing unit 106.

An example of the arrangement of the additional information demultiplexing unit 106 will be described next with reference to the block diagram of FIG. 23.

The captured image of the printed product sent from the imaging sensor 105 is input to a shift detection unit 701. The resolution (imaging sensor resolution) of the imaging sensor 105 is preferably equal to or higher than the resolution (printer resolution) of the printer 103 that creates the printed product. To correctly read scattering information of dots on the printed product, the imaging sensor resolution needs to be at least twice higher than the printer resolution according to the sampling theorem, as a matter of course. However, if the resolution is equal or higher, scattering of dots can be determined to some extent though it may be inaccurate. In the first embodiment, the printer resolution and the imaging sensor resolution are assumed to be equal for descriptive convenience.

The shift detection unit 701 detects a geometric shift of the captured image sent from the imaging sensor 105. Since the captured image has undergone printer output and shooting by the camera-equipped portable terminal 104, the captured image input to the shift detection unit 701 may greatly geometrically shift from the print image generated by the additional information multiplexing unit 102. Hence, the shift detection unit 701 detects the boundary (printed product boundary) between the printed product and a region other than the printed product by edge detection. An example of the captured image of the printed product is the same as that shown in FIG. 8.

FIG. 8 shows an example of the captured image of the printed product. If the printer resolution and the imaging sensor resolution are equal, a large factor to be corrected is the rotation direction (tilt) of an image caused by, for example, a skew during printing on a print medium by the printer 103 or a shift that occurs when the camera-equipped portable terminal 104 is held over the printed product. Hence, by detecting the printed product boundary, the degree and direction of rotation in which the shift occurs can be determined.

A block formation unit 702 sets rectangular regions (blocks) smaller than the block size of the block formation unit 201 at a plurality of points on the captured image at a predetermined interval (the number of skip pixels) (block formation). In FIG. 22, since the block size of the block formation unit 201 is N×M pixels, the size of blocks, that is, a size of P×Q pixels to be set by the block formation unit 702 at a plurality of points on the captured image at a predetermined internal needs to meet P≤N and Q≤M.

That is, block formation is performed such that one block of P×Q pixels is included in a region assumed to be a block of N×M pixels at the time of multiplexing. The "number of skip pixels" described above basically indicates "N pixels in the horizontal direction and M pixels in the vertical direction". It is necessary to divide the shift amount detected by the shift detection unit 701 by the number of blocks to calculate the shift amount per block and add the shift amount to the number of skip pixels to perform correction.

The coefficients of a spatial filter A 703 are created adaptively to the period of a quantization threshold θ1 of the quantization condition A. If the quantization condition A is a quantization threshold matrix shown in FIG. 6A, the spatial filter A 703 is a matrix formed from coefficients shown in FIG. 9A. A coefficient having a value "0" is set in each blank square.

The coefficients of a spatial filter B 704 are created adaptively to the period of the quantization threshold θ1 of the quantization condition B. If the quantization condition B is a quantization threshold matrix shown in FIG. 6B, the spatial filter B 704 is a matrix formed from coefficients shown in FIG. 9B. A coefficient having a value "0" is set in each blank square. This is the same as already described with reference to FIGS. 9A and 9B.

In both the spatial filter A 703 and the spatial filter B 704, each square corresponds to one pixel. The coefficient in the square at the center of 5×5 pixels is applied to a pixel of interest, and the coefficients in the 24 squares on the periphery are applied to the 24 pixels around the pixel of interest. As is apparent from FIGS. 9A and 9B, these spatial filters are edge enhancement filters. In addition, the directionality of the edge to be enhanced matches the directionality of the quantization threshold θ1 upon multiplexing. That is, the spatial filter shown in FIG. 9A is created so as to match the quantization threshold matrix shown in FIG. 6A, and the spatial filter shown in FIG. 9B is created so as to match the quantization threshold matrix shown in FIG. 6B.

A filtering unit 705*a* applies the spatial filter A 703 to the pixels in each block formed by the block formation unit 702, thereby generating a block in which an edge is enhanced independently of the block. For example, when the spatial filter A 703 is applied to the pixel of interest, the pixel value of the pixel of interest is multiplied by the coefficient value "2" given to the square at the center of the spatial filter A 703, and the pixel value of each pixel around the pixel of interest is multiplied by the coefficient value given to the square at the corresponding position in the spatial filter A 703. The pixel value of each pixel in the region having a size of 5×5 pixels with respect to the pixel of interest as the center can thus be multiplied by the coefficient value at the corresponding position in the spatial filter A 703. The sum of the pixel values multiplied by the coefficient values of the 5×5 pixels is obtained, and the sum is set to the pixel value of the pixel of interest. When such processing is performed by setting each pixel in a block as a pixel of interest, a block in which an edge is enhanced can be generated independently of the block.

A filtering unit 705*b* applies the spatial filter B 704 to the pixels in each block formed by the block formation unit 702, thereby generating a block in which an edge is enhanced independently of the block. Application of the spatial filter B 704 to a block is performed in the same way as the application of the spatial filter A 703 to a block.

A sampling unit A 706 performs sampling processing based on certain regularity for a block (the pixel value of each pixel in the block will sometimes to referred to as a converted value) generated by the filtering unit 705*a*. A sampling unit B 707 performs sampling processing based on certain regularity for a block (the pixel value of each pixel in the block will sometimes to referred to as a converted value) generated by the filtering unit 705*b*. In this embodiment, the regularity of the sampling is divided into a periodicity and a phase and processed. That is, the sampling unit A 706 and the sampling unit B 707 use different periodicities of sampling, and execute a plurality of sampling processes while changing the phase. The sampling method will be described later.

A converted value addition unit 708*a* adds the pixel values (converted values) of the pixels in the block after sampling by the sampling unit A 706 for each phase. A converted value addition unit 708*b* adds the pixel values (converted values) of the pixels in the block after sampling by the sampling unit B 707 for each phase. The sampling processing and the converted value addition processing correspond to extracting power of a predetermined frequency vector enhanced by the spatial filters.

A variance calculation unit 709*a* calculates the variances of addition results obtained by adding the pixel values for the respective phases by the converted value addition unit 708*a*. A variance calculation unit 709*b* calculates the variances of addition results obtained by adding the pixel values for the respective phases by the converted value addition unit 708*b*.

A determination unit 710 determines a multiplexed code based on the variances in the respective periodicities obtained by the variance calculation units 709*a* and 709*b*. The code determination is the same as described with reference to FIG. 10. The operation of the additional information demultiplexing unit 106 is also the same as described with reference to FIG. 11. Note that in the description of FIG. 11, the control unit is not illustrated. FIG. 23 shows a control unit 790. Steps executed by the control unit in the explanation of FIG. 11 are executed by the control unit 790. This may be applied to the first embodiment.

The control unit 790 is configured to control the operations of functional units included in the additional information demultiplexing unit 106 and also execute or control each process to be described later as a process to be executed by the additional information demultiplexing unit 106. The control unit 790 includes a ROM 791, a CPU 792, and a RAM 793.

The CPU 792 executes processing using a computer program and data stored in the ROM 791 or the RAM 793. The CPU 792 thus controls the operations of units that constitute the additional information demultiplexing unit 106, and also executes or controls each process to be described later as a process to be executed by the additional information demultiplexing unit 106.

The ROM 791 stores the setting data of the additional information demultiplexing unit 106 and computer programs and data used by the CPU 792 to execute or control each process to be described later as a process to be executed by the additional information demultiplexing unit 106.

The RAM 793 has a work area used by the CPU 792 to execute various kinds of processing.

Figures 24A, 24B:
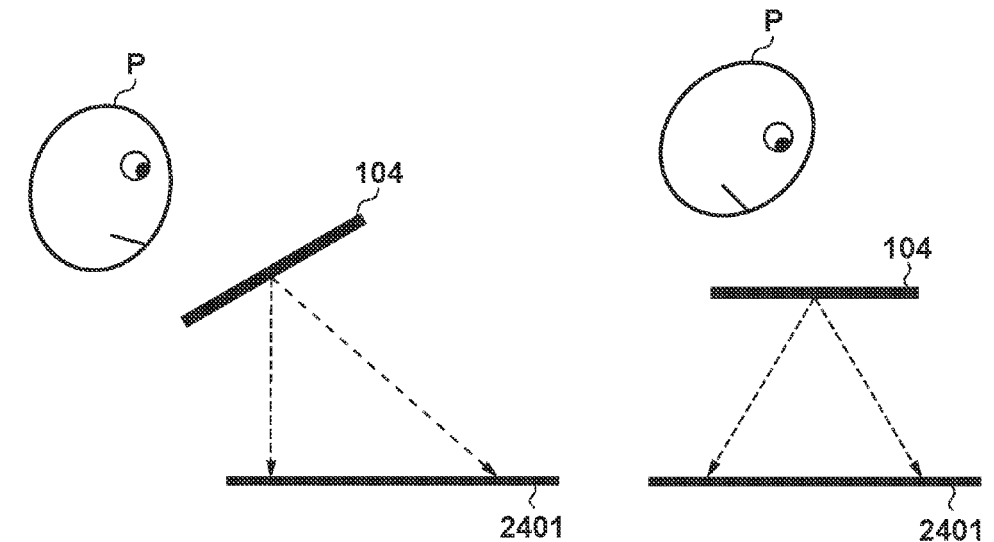
FIGS. 24A and 24B are views for explaining the posture relationship between a printed product 2401 and a camera-equipped portable terminal 104.
Figure 26A:
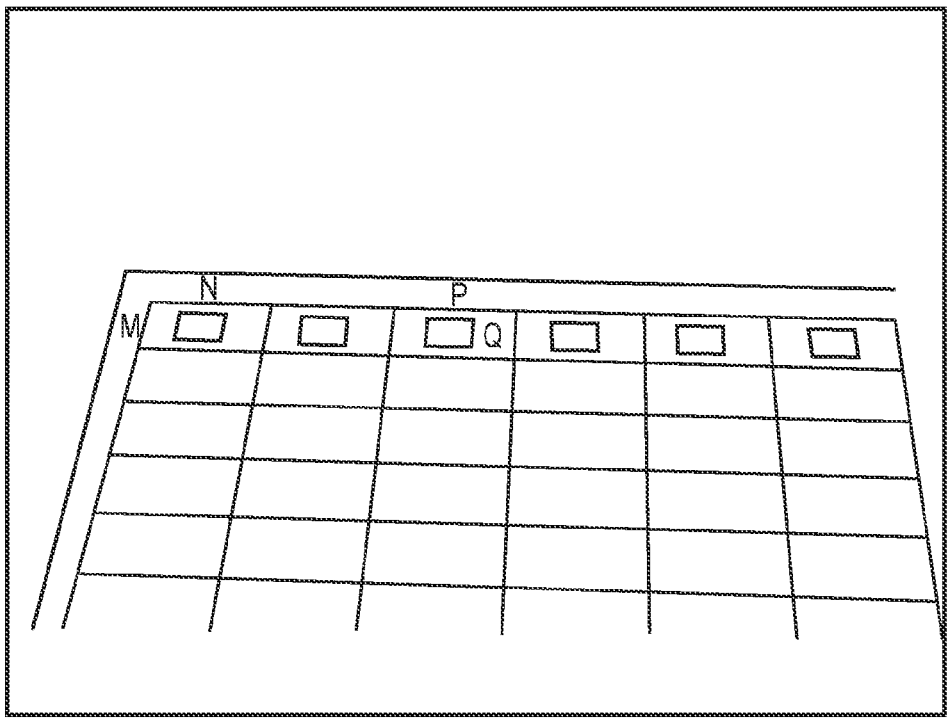
FIGS. 26A and 26B are views showing examples of a print image.

For example, examine a case in which a user P shoots a printed product 2401 using the camera-equipped portable terminal 104, as shown in FIG. 24A. The user P attempts to include the printed product 2401 in the field of view of the imaging sensor 105 while browsing a captured image displayed on the display 109 (provided on a surface of the camera-equipped portable terminal 104 facing the user P) of the camera-equipped portable terminal 104. In FIG. 24A, a dotted arrow indicates the range of the field of vision. However, the user P often tilts the camera-equipped portable terminal 104 to the near side with respect to the printed product 2401 to attain easy vision to the display 109. An image captured by the camera-equipped portable terminal 104 in a posture to the printed product 2401 as shown in FIG. 24A is an image in which the distance of the target is long on the upper side of the captured image and short on the lower side of the captured image, as shown in FIG. 26A.

When capturing is performed while placing the focus on the near side of the printed product 2401 viewed from the camera-equipped portable terminal 104, the captured image has an in-focus state near the lower portion but blurs near the upper portion. In this captured image, additional information can be extracted near the lower portion of the captured image. However, since the captured image blurs near the upper portion, it is difficult or impossible to extract all pieces of additional information on the captured image.

In contrast, when capturing is performed while placing the focus on the far side of the printed product 2401 viewed from the camera-equipped portable terminal 104, the captured image has an in-focus state near the upper portion but blurs near the lower portion. In this captured image, additional information can be extracted near the upper portion of the captured image. However, since the captured image blurs near the lower portion, it is difficult or impossible to extract all pieces of additional information on the captured image.

Figure 26B:
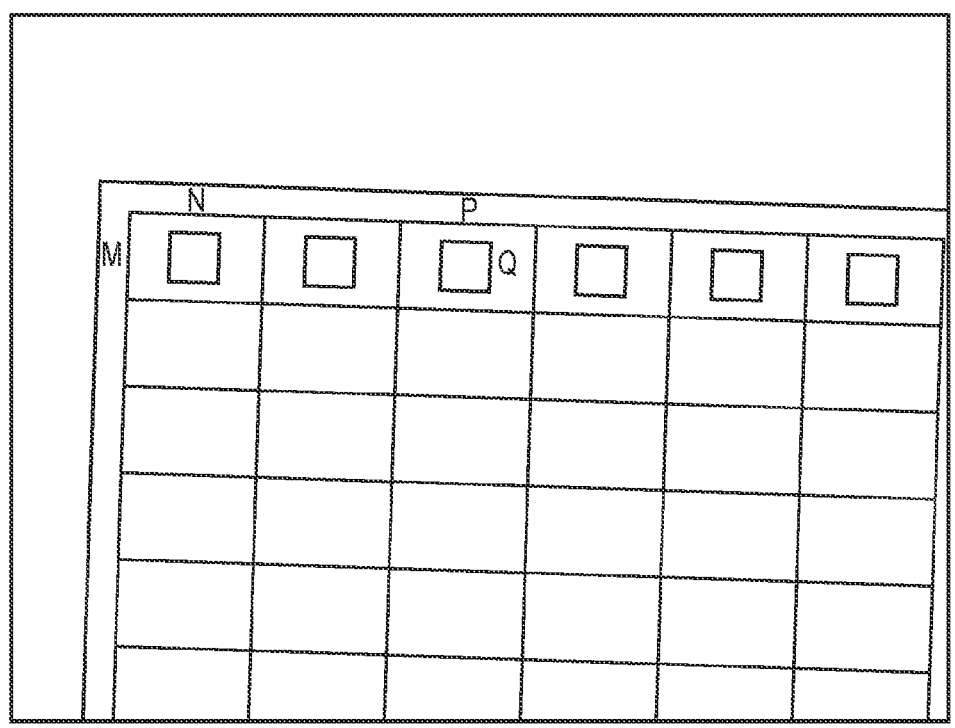

To prevent the captured image from blurring at any point of the printed product 2401 (to capture an image as shown in FIG. 26B), the posture of the camera-equipped portable terminal 104 needs to be adjusted such that the imaging direction of the camera-equipped portable terminal 104 is almost perpendicular to the surface of the printed product 2401, as shown in FIG. 24B.

To determine, before additional information extraction, whether additional information can be extracted at any point on the printed product in the captured image, it is determined whether an end of the range of the printed product included in the captured image has a blur (whether position information can be extracted near an end). Hence, the camera-equipped portable terminal 104 according to this embodiment executes processing according to the flowchart of FIG. 25 before additional information is extracted from the captured image of the printed product.

<Step S2501>

The imaging sensor 105 performs an imaging operation, thereby generating a captured image. Imaging by the imaging sensor 105 is performed under the control of the CPU 792 according to a user operation on a switch or button (not shown) of the camera-equipped portable terminal 104 or a touch screen if the display 109 is formed from a touch screen. Without such instruction input, the image of each frame continuously captured by the imaging sensor 105 may be used as a captured image in the following processing, as a matter of course.

Here, assume that the imaging sensor 105 captures an image of a printed product on which the print image (the print image on which position information and additional information are multiplexed) shown in FIG. 22 is printed.

<Step S2502>

The additional information demultiplexing unit 106 performs the above-described information extraction processing including processing according to the flowchart of FIG. 11, thereby extracting position information from a plurality of predetermined points on the captured image generated in step S2501.

For example, in the captured image of the printed product on which the print image shown in FIG. 22 is printed, the captured image is divided into a plurality of divided regions, and the divided regions are scanned in the raster scan order from the divided region at the upper left corner to the divided region at the lower right corner, thereby performing position information extraction processing. If "position information representing the minimum value out of the pieces of position information multiplexed on the print image" ("0000" in the example of FIG. 22) is extracted from a certain divided region, the extraction processing ends. Next, the divided regions are scanned in the raster scan order from the divided region at the lower right corner to the divided region at the upper left corner, thereby performing position information extraction processing. If "position information representing the maximum value out of the pieces of position information multiplexed on the print image" ("1000" in the example of FIG. 22) is extracted from a certain divided region, the extraction processing ends.

Note that the size of the divided region may be much larger than the above-described size of N×M pixels. For example, the captured image may equally be divided into four parts, and each part may be set to a divided region. Position information can be obtained by extracting a code (1-bit value) from each of four adjacent position information multiplexing blocks and arranging the extracted codes in accordance with the positions of the position information multiplexing blocks.

<Step S2503>

The CPU 792 determines whether both the position information representing the minimum value out of the pieces of position information multiplexed on the print image ("0000" in the example of FIG. 22) and the position information representing the maximum value out of the pieces of position information multiplexed on the print image ("1000" in the example of FIG. 22) are extracted in step S2502. In FIG. 22, if both the position information "0000" and the position information "1000" can be extracted, this means that the upper left corner and the lower right corner of the captured image have image quality that allows position information extraction, that is, the upper left corner and the lower right corner of the captured image have an in-focus state. In this case, each additional information multiplexed on the captured image can be extracted. On the other hand, if at least one of the position information "0000" and the position information "1000" cannot be extracted, this means that at least one of the upper left corner and the lower right corner of the captured image does not have image quality that allows position information extraction. That is, at least one of the upper left corner and the lower right corner of the captured image does not have an in-focus state. In this case, additional information that cannot be extracted from the captured image may exist.

If both the position information representing the minimum value out of the pieces of position information multiplexed on the print image and the position information representing the maximum value out of the pieces of position information multiplexed on the print image are extracted in step S2502, the process advances to step S2504. On the other hand, if at least one of the position information representing the minimum value out of the pieces of position information multiplexed on the print image and the position information representing the maximum value out of the pieces of position information multiplexed on the print image is not extracted, the process returns to step S2501.

<Step S2504>

The CPU 792 notifies the user of a message representing that additional information extraction (demultiplexing) from the captured image is possible. For example, a message text representing that additional information extraction (demultiplexing) from the captured image is possible or an image (including an animation image) that expresses a message representing that additional information extraction (demultiplexing) from the captured image is possible is displayed on the display 109. Alternatively, for example, a voice that expresses a message representing that additional information extraction (demultiplexing) from the captured image is possible is output from the speaker 108. To cause the camera-equipped portable terminal 104 to maintain the state (position and posture) in which additional information extraction (demultiplexing) from the captured image is possible, a message that notifies the user not to change the state (position and posture) of the camera-equipped portable terminal 104 may be output. Note that the message notification method is not limited to this, and a light-emitting component such as an LED may be caused to simply emit light in a predetermined light-emitting pattern. The above-described message text, an image (including an animation image) that expresses the message, or a message as voice information may be transmitted to an appropriate transmission destination via a network. In addition, position information may be acquired, and a change in the progress state of a progress bar may be displayed on the screen in accordance with the number of acquired position information.

In step S2503, the CPU 792 determines whether position information is extracted in each of the upper and lower portions of the image. However, the combination of regions corresponding to ends different from each other is not limited to this. For example, the determination may be performed for the right and left portions. The determination may be performed for a plurality of predetermined points including, for example, at least three points, and if it is determined for the plurality of predetermined points that position information can be acquired, the notification in step S2504 may be done.

The determination need not always be performed for both the upper and lower portions of the image. For example, the determination may be performed only for the upper portion. That is, when the user performs shooting with an imaging device such as a smartphone tilted to the user side, position information cannot be extracted at high possibility in not the lower portion but the upper portion of the image. For this reason, if position information can be extracted in the upper portion, position information can be extracted in the lower option as well at high possibility. Hence, the determination may be performed only for the upper portion.

In steps S2502 and S2503, the acquisition and determination are performed for position information different from additional information multiplexed on the printed product. However, the present invention is not limited to this. For example, the acquisition and determination may be performed for the additional information.

Figure 27A:
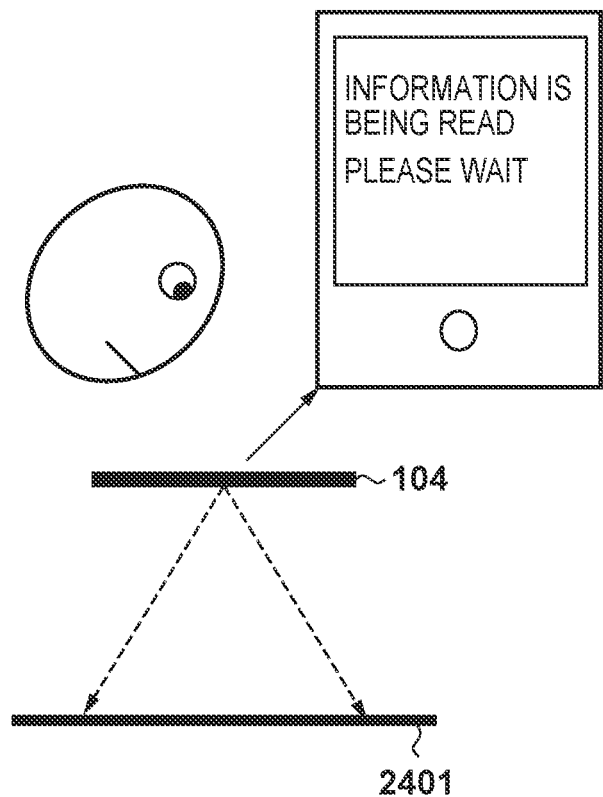
FIGS. 27A and 27B are views showing examples of a message notification.

FIG. 27A shows an example of a message displayed on the display 109 in step S2504. In FIG. 27A, since additional information extraction (demultiplexing) from the captured image is possible, the extraction is started, and a message representing that the additional information is currently being extracted is displayed on the display 109.

Figure 27B:
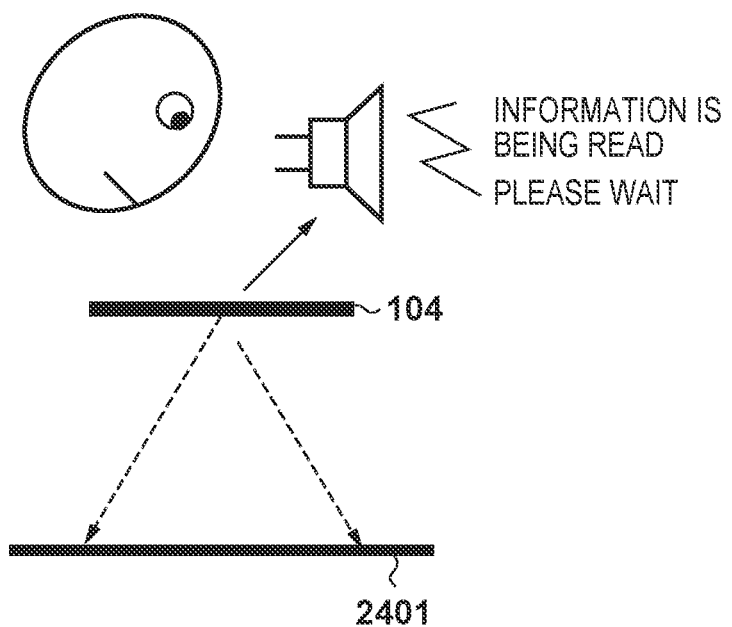

FIG. 27B shows an example of a message output from the speaker 108 in step S2504. In FIG. 27B, since additional information extraction (demultiplexing) from the captured image is possible, the extraction is started, and a message representing that the additional information is currently being extracted is output as a voice from the speaker 108.

Figure 25:
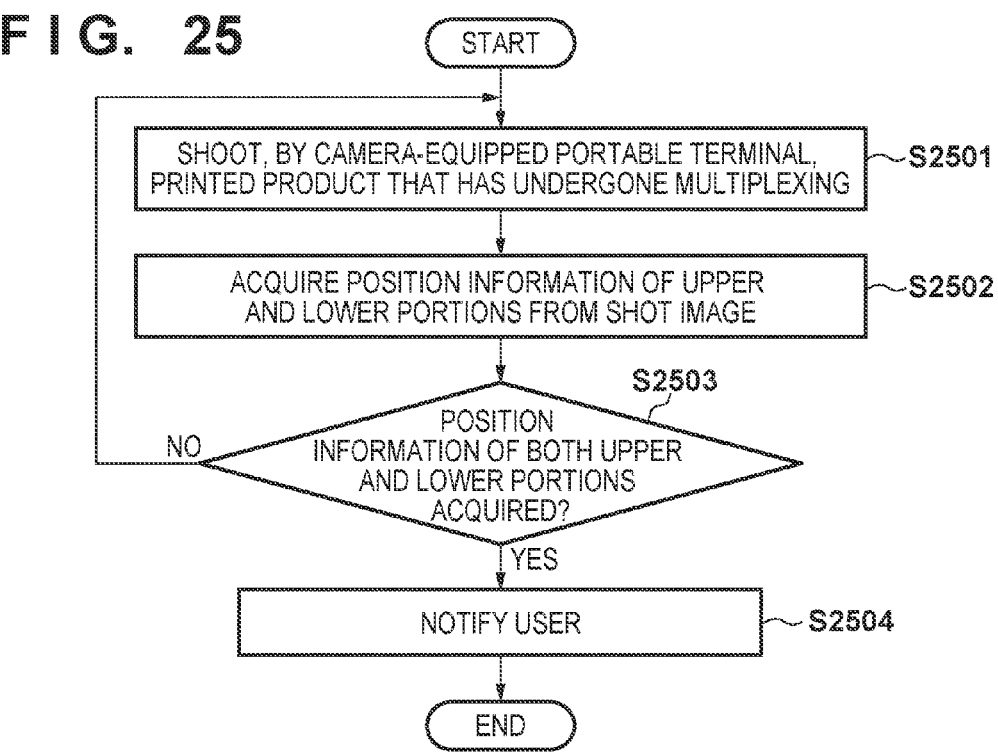
FIG. 25 is a flowchart showing determination processing of determining whether additional information can be extracted.

Note that in the flowchart of FIG. 25, if at least one of the position information representing the minimum value out of the pieces of position information multiplexed on the print image and the position information representing the maximum value out of the pieces of position information multiplexed on the print image is not extracted, the user is not notified of anything. However, in this case as well, the user may be notified of a corresponding message (another message). That is, a message text representing that additional information extraction (demultiplexing) from the captured image is impossible or an image (including an animation image) that expresses a message representing that additional information extraction (demultiplexing) from the captured image is impossible is displayed on the display 109. Alternatively, a voice that expresses a message representing that additional information extraction (demultiplexing) from the captured image is impossible is output from the speaker 108. Note that the message notification method is not limited to this, and a light-emitting component such as an LED may be caused to simply emit light in a predetermined light-emitting pattern. The above-described message text, an image (including an animation image) that expresses the message, or a message as voice information may be transmitted to an appropriate transmission destination via a network.

In addition, if at least one of the position information representing the minimum value out of the pieces of position information multiplexed on the print image and the position information representing the maximum value out of the pieces of position information multiplexed on the print image is not extracted, the posture of the camera-equipped portable terminal 104 needs to be corrected. For example, if the printed product 2401 and the camera-equipped portable terminal 104 hold a posture relationship as shown in FIG. 24A, the posture relationship needs to be corrected to that shown in FIG. 24B. In this case, the user may be notified of a message prompting the user to make a movement to correct the posture of the camera-equipped portable terminal 104.

Furthermore, if at least one of the position information representing the minimum value out of the pieces of position information multiplexed on the print image and the position information representing the maximum value out of the pieces of position information multiplexed on the print image is not extracted, the user may be notified how to correct the posture of the camera-equipped portable terminal 104. For example, assume that as for the position information representing the minimum value and the position information representing the maximum value, extraction of the former succeeds, and extraction of the latter fails. In this case, as a possible cause, a portion of the printed product included near the upper portion of the captured image is in focus, and a portion of the printed product included near the lower portion of the captured image is out of focus. In this case, the user is notified, using a character string, an icon, or the like, that the portion of the printed product included near the lower portion of the captured image can be brought into focus by tilting the camera-equipped portable terminal 104 with respect to its upper portion as an axis. Conversely, assume that as for the position information representing the minimum value and the position information representing the maximum value, extraction of the former fails, and extraction of the latter succeeds. In this case, as a possible cause, a portion of the printed product included near the lower portion of the captured image is in focus, and a portion of the printed product included near the upper portion of the captured image is out of focus. In this case, the user is notified, using a character string, an icon, or the like, that the portion of the printed product included near the upper portion of the captured image can be brought into focus by tilting the camera-equipped portable terminal 104 with respect to its lower portion as an axis.

As described above, various message types and notification methods are usable. Some of the above messages may be used in combination, and two or more types of notification methods may be used together.

Note that in the above example, focus is placed on the tilt of the camera-equipped portable terminal 104 in the vertical direction. For this reason, position information of each of a set formed from the block 2201 and position information multiplexing blocks adjacent to it and a set formed from a block 2203 and position information multiplexing blocks adjacent to it is extracted. However, to cope with a tilt in the horizontal direction, the position numbers of three sets including the two sets described above and a set formed from a block 2204 and position information multiplexing blocks adjacent to it are acquired.

As described above, which position information (a block (set) at which position) is to be read from the captured image changes depending on the application purpose. Hence, for example, a plurality of kinds of information about which position information should be read from the captured image may be held in accordance with a state such as the posture of the camera-equipped portable terminal 104, and position information according to the current state of the camera-equipped portable terminal 104 may be read.

Information applicable as position information is not limited to a serial number on a set basis, as described above, and another information may be employed. For example, the number of blocks, the number of pixels, or a distance on XY coordinates may be used. The contents of additional information and an embedding position may be linked and stored, and the embedding position may be specified in accordance with the contents of additional information.

As described above, according to this embodiment, before additional information is read from a captured image of a printed product with the embedded additional information, a code embedded at a different position on the printed product is extracted and analyzed, thereby notifying the user whether the reading is possible before additional information extraction.

[Fifth Embodiment]

The difference from the fourth embodiment will mainly be described below, and this embodiment is the same as the fourth embodiment unless it is specifically stated otherwise. In the fourth embodiment, both position information and additional information are multiplexed on a print image by the same method. In this embodiment, however, multiplexing of position information is performed such that the position information is read at a speed higher than in the fourth embodiment.

Figure 28A:
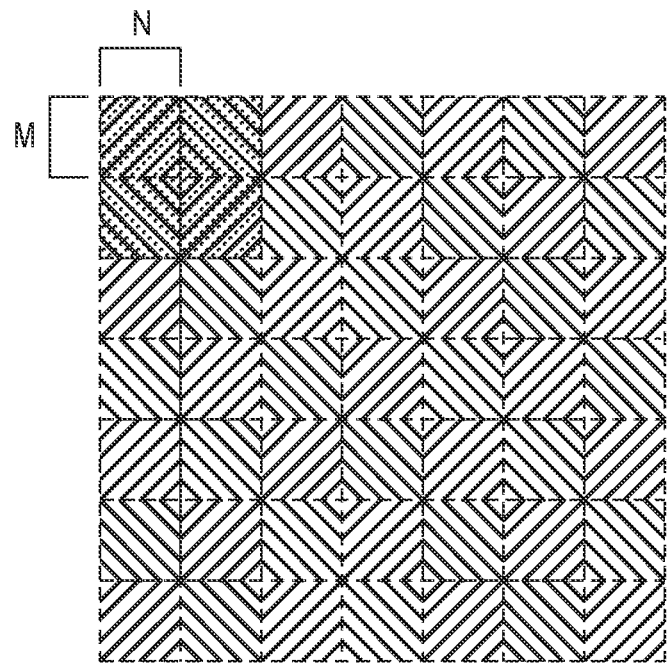
FIGS. 28A and 28B are views for explaining the second embodiment.
Figure 28B:
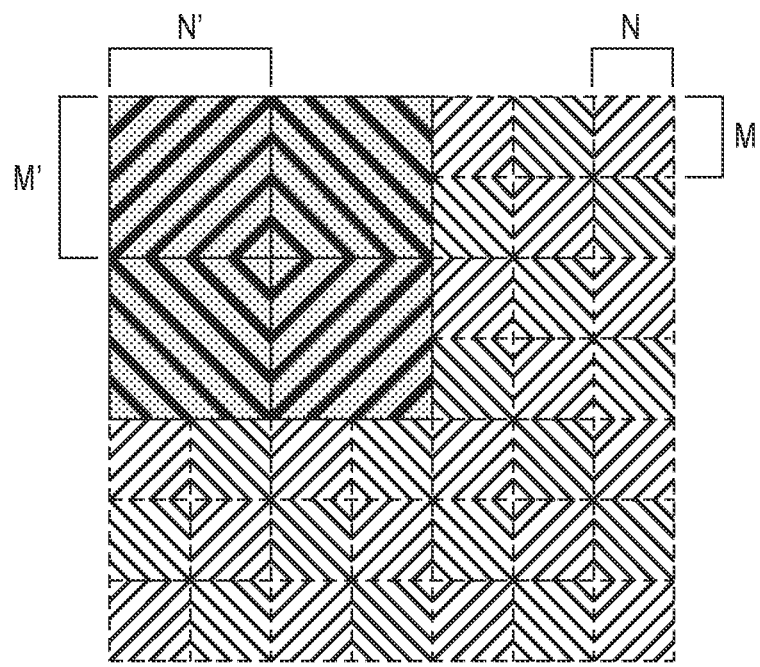

For example, in the fourth embodiment, when multiplexing position information, multiplexing is performed for each block having a size of N×M pixels, as shown in FIG. 28A. In this embodiment, however, when multiplexing position information, multiplexing is performed for each block having a size of N' (N'>N)×M' (M'>M) pixels, as shown in FIG. 28B. When the size of the position information multiplexing block is increased, position information can be read at a high speed. In addition, the multiplexing period hardly degrades at the time of printing. Since the block size is large, even if the multiplexing period of part of a position information multiplexing block degrades, the multiplexing period of other portions remains, and position information can thus be read. The same effect as described above can be implemented by lowering the resolution of the multiplexing period of the position information multiplexing block or increasing the intensity of the multiplexing period. When the resolution of the multiplexing period is lowered, the multiplexing period hardly degrades at the time of printing. Assuming quaternary error diffusion processing, a portion with a high multiplexing intensity is expressed by quaternary notation, and a portion with a low multiplexing intensity is expressed by binary notation. A portion where the intensity of the multiplexing period is high hardly degrades at the time of printing.

Note that in this embodiment, the size of a position information multiplexing block is made larger than the size of an additional information multiplexing block, and when multiplexing position information, a multiplexing method that hardly causes degradation at the time of shooting or facilitates reading at the time of printing is used, as compared to additional information. This embodiment can be used for another method by exploiting the characteristic.

For example, a unique ID number is multiplexed on a print image as well as position information, and the print image is printed. When shooting this printed product, the position information, the ID number, and additional information are read and stored in a camera-equipped portable terminal 104 for the first time. In reading for the second time, when the ID number is read, it is compared with the ID number stored in the camera-equipped portable terminal 104. If the ID numbers match, the stored additional information is acquired, thereby reading the additional information at a high speed.

When a version number is multiplexed on a print image as well as position information, the processing procedure can be switched in accordance with the version of the additional information demultiplexing unit. For example, assume that there exist a printed product in which version number "1.00" is embedded and a printed product in which version number "2.00" is embedded, and an additional information demultiplexing unit of version number "1.00" captures the printed product of version number "1.00". At this time, the additional information demultiplexing unit reads the version number from the captured image. Since the read version number is 1.00, which is the same as the version number of the additional information demultiplexing unit, subsequent additional information extraction processing is performed. On the other hand, assume that the additional information demultiplexing unit of version number "1.00" captures the printed product of version number "2.00". At this time, the additional information demultiplexing unit reads the version number from the captured image. Since the read version number is 2.00, which is different from the version number of the additional information demultiplexing unit, a message to notify the user that "reading is impossible" is notified, and subsequent processing is not performed.

Note that the fourth and fifth embodiments can be summarized as follows.

(1) There is provided an information processing apparatus including: an acquisition unit configured to acquire a captured image of a printed product; and a notification unit configured to notify a message concerning extraction of additional information printed at a plurality of points on the printed product based on whether out of codes printed at the plurality of points on the printed product, a code is extracted from a predetermined point of the captured image.

(2) The code is a code different from a code of the additional information.

(3) Image information on which the code is multiplexed by a method that enables quick extraction as compared to the code of the additional information is printed on the printed product.

(4) The code is the code of the additional information.

(5) The notification unit notifies the message based on whether the code is extracted from each of a plurality of predetermined points.

(6) The plurality of predetermined points are points at ends of the printed product which are different from each other.

(7) When the code is extracted from the predetermined point, the notification unit notifies a message representing that extraction of the additional information is possible.

(8) When the code cannot be extracted from the predetermined point, the notification unit notifies the message.

(9) The message is a message representing that extraction of the additional information is impossible.

(10) The message is a message that prompts a user to move the information processing apparatus.

(11) The notification unit determines, based on a point where the code can be extracted in the captured image, a posture of the information processing apparatus to be corrected, and notifies the message to notify the determined posture.

(12) The message is image information or voice information.

(13) The acquisition unit acquires the captured image of the printed product by capturing the printed product.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-198930, filed Oct. 6, 2015, and 2015-198931, filed Oct. 6, 2015, which are hereby incorporated by reference herein in their entirety.

What is claimed is:

1. An information processing apparatus having an image capturing unit for capturing an image, comprising:
a first acquisition unit configured to acquire first image data by the image capturing unit capturing the image under a first image capturing condition; and
a second acquisition unit configured to acquire first additional information from the first image data;
a display control unit configured to cause a display unit of the information processing apparatus to display information that prompts a user to move the information processing apparatus based on second additional information cannot being acquired after the first additional information is acquired,
wherein the second acquisition unit acquires the second additional information embedded in the image from the second image data captured under a second image capturing condition different than the first image capturing condition after the information that prompts the user to move the information processing apparatus is displayed,
wherein output processing corresponding to the first and second additional information is performed in the information processing apparatus, and
wherein the first acquisition unit, the second acquisition unit and the display control unit are implemented by at least one processor.

2. The apparatus according to claim 1, further comprising a specifying unit configured to specify a noise generation position as a factor that impedes acquisition of the second additional information in the captured image, and
a decision unit configured to decide a moving direction of the information processing apparatus for capturing an image which does not contain noise based on the specified noise generation position,
wherein the display control unit causes the display unit of the information processing apparatus to further display information representing the decided moving direction as information as to how to move the information processing apparatus, and
wherein the specifying unit and the decision unit are implemented by the at least one processor.

3. The apparatus according to claim 2, wherein the decision unit further decides a moving amount of the information processing apparatus for capturing an image that does not contain the noise based on the specified noise generation position,
wherein the display unit displays information indicating the moving direction and the moving amount of the information processing apparatus as the information as to how to move the information processing apparatus.

4. The apparatus according to claim 1, further comprising:
a changing unit configured to change a capturing condition from the first capturing condition to the second capturing condition when the second acquisition unit cannot acquire the second additional information; and
a combining unit configured to combine the first and second additional information
wherein the combining unit are implemented by the at least one processor.

5. The apparatus according to claim 4, further comprising an evaluation unit configured to evaluate a plurality of multiplexing items included in the first additional information and a plurality of multiplexing items included in the second additional information,
wherein the combining unit combines a multiplexing item that exceeds a threshold as an evaluation result of the evaluation unit out of the plurality of multiplexing items included in the first additional information and a multiplexing item that exceeds the threshold as the evaluation result of the evaluation unit out of the plurality of multiplexing items included in the second additional information, and
wherein the evaluation unit is implemented by the at least one processor.

6. The apparatus according to claim 4, wherein the changing unit changes at least one of a focus position and light ON/OFF as the capturing condition.

7. The apparatus according to claim 1, wherein the display control unit, when the second acquisition unit cannot acquire all of the second additional information after the second acquisition unit starts the acquisition processing for the second additional information, causes a display unit of the information processing apparatus to display information that prompts a user to move the information processing apparatus.

8. The apparatus according to claim 1, wherein a voice is output as the output processing corresponding to the first and second additional information.

9. An information processing method that is performed by an information processing apparatus having an image capturing unit for capturing an image, the method comprising:
acquiring first image data by the image capturing unit capturing the image under a first image capturing condition; and
acquiring first additional information from the first image data;
causing a display unit of the information processing apparatus to display information that prompts a user to move the information processing apparatus based on second additional information cannot being acquired after the first additional information is acquired,
wherein in the second acquisition processing , the second additional information embedded in the image is acquired from the second image data captured after the information that prompts the user to move the information processing apparatus is displayed, and
wherein output processing corresponding to the first and second additional information is performed in the information processing apparatus.

10. The method according to claim 9, further comprising specifying a noise generation position as a factor that impedes acquisition of the second additional information in the captured image, and
deciding a moving direction of the information processing apparatus for capturing an image which does not contain noise based on the specified noise generation position,
wherein the displaying causes the display unit of the information processing apparatus to further display information representing the decided moving direction as information as to how to move the information processing apparatus .

11. The method according to claim 10, wherein the deciding further decides a moving amount of the information processing apparatus for capturing an image that does not contain the noise based on the specified noise generation position,
wherein the displaying displays information indicating the moving direction and the moving amount of the information processing apparatus as the information as to how to move the information processing apparatus.

12. The method according to claim 9, further comprising:
changing a capturing condition from the first capturing condition to the second capturing condition when the second additional information cannot be acquired; and
combining the first and second additional information.

13. The method according to claim 12, further comprising evaluating a plurality of multiplexing items included in the first additional information and a plurality of multiplexing items included in the second additional information,
wherein in the combining, a multiplexing item that exceeds a threshold as an evaluation result out of the plurality of multiplexing items included in the first additional information and a multiplexing item that exceeds the threshold as the evaluation result out of the plurality of multiplexing items included in the second additional information are combined.

14. The method according to claim 12, wherein in the changing, at least one of a focus position and light ON/OFF is changed as the capturing condition.

15. The method according to claim 9, wherein the displaying, when all of the second additional information cannot be acquired after the acquisition processing is started, causes a display unit of the information processing apparatus to display information that prompts a user to move the information processing apparatus.

16. The method according to claim 9, wherein a voice is output as the output processing corresponding to the first and second additional information.

17. A non-transitory computer-readable storage medium that records a program configured to cause a computer having an image capturing unit for capturing an image to execute an image processing method, the method comprising:
acquiring first image data by the image capturing unit capturing the image under a first image capturing condition; and
acquiring first additional information from the first image data;
causing a display unit of the information processing apparatus to display information that prompts a user to move the information processing apparatus based on second additional information cannot being acquired after the first additional information is acquired,
wherein in the second acquisition processing, the second additional information embedded in the image is acquired from the second image data captured after the information that prompts the user to move the information processing apparatus is displayed, and
wherein output processing corresponding to the first and second additional information is performed in the information processing apparatus.

18. The medium according to claim 17, wherein the method further comprises specifying a noise generation position as a factor that impedes acquisition of the second additional information in the captured image, and deciding a moving direction of the information processing apparatus for capturing an image which does not contain noise based on the specified noise generation position, and
wherein the displaying causes the display unit to further display information representing the decided moving direction as information as to how to move the information processing apparatus.

19. The medium according to claim 18, wherein the deciding further decides a moving amount of the information processing apparatus for capturing an image that does not contain the noise based on the specified noise generation position,
wherein the displaying displays information indicating the moving direction and the moving amount of the information processing apparatus as the information as to how to move the information processing apparatus.

20. The medium according to claim 17, wherein the method further comprises:
changing a capturing condition from the first capturing condition to the second capturing condition when the second additional information cannot be acquired; and
combining the first and second additional information.

21. The medium according to claim 20, wherein the method further comprises evaluating a plurality of multiplexing items included in the first additional information and a plurality of multiplexing items included in the second additional information, and in the combining, a multiplexing item that exceeds a threshold as an evaluation result out of the plurality of multiplexing items included in the first additional information and a multiplexing item that exceeds the threshold as the evaluation result out of the plurality of multiplexing items included in the second additional information are combined.

22. The medium according to claim 20, wherein in the changing, at least one of a focus position and light ON/OFF is changed as the capturing condition.

23. The medium according to claim 17, wherein the displaying, when all of the second additional information cannot be acquired after the acquisition processing is started, causes a display unit of the information processing apparatus to display information that prompts a user to move the information processing apparatus.

24. The medium according to claim 17, wherein a voice is output as the output processing corresponding to the first and second additional information.

* * * * *